US011915543B2

(12) United States Patent
Mizzi et al.

(10) Patent No.: US 11,915,543 B2
(45) **Date of Patent: *Feb. 27, 2024**

(54) VISUAL METER PROGRESSION ON SYMBOL

(71) Applicant: Aristocrat Technologies, Inc., Las Vegas, NV (US)

(72) Inventors: Jennifer Mizzi, Round Rock, TX (US); Erick Ching, Cedar Park, TX (US); Peter Wasielewski, Austin, TX (US); Tsung-Cheng Lin, Leander, TX (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/652,894

(22) Filed: Feb. 28, 2022

(65) Prior Publication Data

US 2022/0189240 A1 Jun. 16, 2022

Related U.S. Application Data

(63) Continuation of application No. 16/857,054, filed on Apr. 23, 2020, now Pat. No. 11,288,914.

(Continued)

(51) Int. Cl.
*G07F 17/32* (2006.01)
*G07F 17/34* (2006.01)

(52) U.S. Cl.
CPC ...... *G07F 17/3213* (2013.01); *G07F 17/3267* (2013.01); *G07F 17/34* (2013.01)

(58) Field of Classification Search
CPC ............. G07F 17/3213; G07F 17/3267; G07F 17/323; G07F 17/3244; G07F 17/3258; G07F 17/34
See application file for complete search history.

(56) References Cited

U.S. PATENT DOCUMENTS 5,833,537 A 11/1998 Barrie
6,186,894 B1 * 2/2001 Mayeroff ................ G07F 17/34 463/16

(Continued)

OTHER PUBLICATIONS

Office Action dated Jun. 15, 2021 for U.S. Appl. No. 16/857,054 (pp. 1-16).

(Continued)

*Primary Examiner* — Justin L Myhr
(74) *Attorney, Agent, or Firm* — Weaver Austin Villeneuve & Sampson LLP

(57) ABSTRACT

Some methods involve receiving user input for initiation of an instance of a slot game, determining a game outcome that includes corresponding display symbols and an award determination, controlling a display system to display the display symbols at a plurality of display symbol positions and controlling the display system to present award effects corresponding to the award determination. The display symbol positions may be arranged in display symbol rows and display symbol columns. At least one of the display symbols may be a metamorphic display symbol that includes a metamorphic image. A state of the first metamorphic image may correspond to a level of progress towards attaining a goal. Progress towards the goal may be based, at least in part, in the number of occurrences of the metamorphic display symbol.

20 Claims, 23 Drawing Sheets

Related U.S. Application Data

(60) Provisional application No. 62/923,264, filed on Oct. 18, 2019.

(56) References Cited

U.S. PATENT DOCUMENTS

| | | | |
|---|---|---|---|
| 6,290,600 | B1 | 9/2001 | Glasson |
| 8,801,519 | B2 | 8/2014 | Singer |
| 2002/0016200 | A1 | 2/2002 | Baerlocher |
| 2003/0022712 | A1 | 1/2003 | Locke |
| 2003/0064789 | A1 | 4/2003 | Suzuki |
| 2003/0064793 | A1 | 4/2003 | Baerlocher |
| 2004/0048645 | A1 | 3/2004 | Webb |
| 2004/0048646 | A1 | 3/2004 | Martin |
| 2009/0042636 | A1 | 2/2009 | Taylor |
| 2009/0111570 | A1 | 4/2009 | Yoshizawa |
| 2009/0131145 | A1 | 5/2009 | Aoki |
| 2009/0215523 | A1 | 8/2009 | Acres |
| 2013/0130773 | A1 | 5/2013 | Nakamura |
| 2015/0302686 | A1 | 10/2015 | Jaffe |
| 2015/0356833 | A1 | 12/2015 | Aoki |
| 2017/0200343 | A1 * | 7/2017 | Hosokawa ............ G07F 17/329 |
| 2018/0025588 | A1 | 1/2018 | Ma |
| 2018/0061176 | A1 | 3/2018 | Berman |
| 2018/0311582 | A1 | 11/2018 | Gerhard |
| 2019/0139372 | A1 | 5/2019 | Berman |
| 2019/0156630 | A1 | 5/2019 | Cuddy |
| 2020/0202662 | A1 | 6/2020 | Halvorson |
| 2020/0279451 | A1 | 9/2020 | La Guardia |

OTHER PUBLICATIONS

Office Action (Notice of Allowance and Fees Due (PTOL-85)) dated Nov. 22, 2021 for U.S. Appl. No. 16/857,054 (pp. 1-8).

* cited by examiner

1100

VISUAL METER PROGRESSION ON SYMBOL

RELATED APPLICATIONS

The present application claims priority to, and is a continuation of, U.S. patent application Ser. No. 16/857,054, filed Apr. 23, 2020 and entitled "VISUAL METER PROGRESSION ON SYMBOL", which issued as U.S. Pat. No. 11,288,914 and which claims priority to United States Provisional Patent Application No. 62/923,264, filed Oct. 10, 2019 and entitled "VISUAL METER PROGRESSION ON SYMBOL", both of which are hereby incorporated by reference in their entireties.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

At least some aspects of the present disclosure may be implemented via an apparatus. For example, one or more devices may be configured for performing, at least in part, the methods disclosed herein. In some implementations, the apparatus may be a gaming device. The gaming device may include a display system that includes one or more displays, an interface system including one or more user interfaces and a control system that includes one or more processors.

The interface system may include one or more network interfaces, one or more interfaces between the control system and a memory system, one or more interfaces between the control system and another device, one or more user interfaces and/or one or more external device interfaces. The control system may include at least one of a general purpose single- or multi-chip processor, a digital signal processor (DSP), an application specific integrated circuit (ASIC), a field programmable gate array (FPGA) or other programmable logic device, discrete gate or transistor logic, or discrete hardware components. Accordingly, in some implementations the control system may include one or more processors and one or more non-transitory storage media operatively coupled to the one or more processors.

The control system may, for example, be configured for receiving, via the interface system, user input for initiation of an instance of a wagering game. In some examples, the wagering game may be, or may include, a slot game. The control system may be configured for determining a game outcome and corresponding display symbols. The game outcome may include an award determination. At least one of the display symbols may be a first metamorphic display symbol that includes a first metamorphic image. A state of the first metamorphic image may correspond to a level of progress towards attaining a goal. According to some examples, the state of the first metamorphic image may correspond to a number of coins displayed as part of the first metamorphic image. In some examples, the state of the first metamorphic image may correspond to a number of arrowheads or buffalo heads displayed as part of the first metamorphic image.

The control system may be configured for controlling the display system to display the display symbols at a plurality of display symbol positions on a display device of the display system. In some examples, the plurality of display symbol positions may be arranged in a plurality of display symbol rows and display symbol columns. The control system may be configured for controlling the display system to present award effects corresponding to the award determination.

According to some examples, the control system may be configured for controlling the display system to display one or more progress indicators corresponding to the level of progress towards attaining the goal. In some instances, the one or more progress indicators may be displayed separately from the first metamorphic display symbol. For example, the control system may be configured for controlling the display system to display the display symbol positions in a first area and to display the one or more progress indicators in a second area. In some examples, the one or more progress indicators may be, or may include, a progress meter.

According to some implementations, the one or more progress indicators may be, or may include, a plurality of images arranged between adjacent display symbol columns or adjacent display symbol rows. In some such examples, the number of illuminated instances of the plurality of images corresponds to the level of progress towards attaining the goal. According to some implementations, the plurality of images may be arranged on two sides of a display symbol column or a display symbol row. In some examples, instances of the plurality of images may be arranged from a bottom to a top of a display symbol column. According to some implementations, the control system may be configured for controlling the display system to display an award corresponding to the goal at the top of a display symbol column and/or at one end of a display symbol row.

In some instances, the goal may be, or may include, a feature presentation. The feature presentation may, in some instances, include one or more bonus games. In some implementations, the level of progress towards attaining the goal may correspond with a number of instances during which the first metamorphic display symbol is presented as part of a game outcome. In some examples, attaining the goal may require an initiation of multiple wagering game instances.

In some implementations, the first metamorphic display symbol also may indicate an award. According to some such implementations, the control system may be further configured for controlling the display system to display a sequence of images corresponding to a rotation of the first metamorphic display symbol to reveal the award. In some examples, a relative value of the first metamorphic display symbol award corresponds to the state of the first metamorphic image.

According to some examples, at least one of the display symbols may be a second metamorphic display symbol that includes a second metamorphic image. In some instances, the first metamorphic display symbol may be a first type of metamorphic display symbol and the second metamorphic display symbol may be a second type of metamorphic display symbol. The second metamorphic display symbol may, in some instances, also indicate an award. In some examples, a relative value of the second metamorphic display symbol award may correspond to a state of the second metamorphic image.

Some or all of the methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, various innovative aspects of the subject matter described in this disclosure can be implemented in one or more non-transitory media having software stored thereon. The software may, for example, be executable by one or more components of a control system such as those disclosed herein. The software may, for example, include instructions for performing one or more of the methods disclosed herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings generally indicate like elements.

DETAILED DESCRIPTION

Some aspects of the subject matter described in this disclosure can be implemented to realize one or more of the following potential advantages. In some implementations, a metamorphic image may be presented on one or more types of slot symbols. At least one type of slot symbol may include a metamorphic image having a state that corresponds to a level of progress towards attaining a goal. In some instances, the goal may be a feature presentation, which may include one or more bonus games. According to some such implementations, progress towards the goal may be based, at least in part, in the number of occurrences of the slot symbol that includes a particular type of metamorphic image. In some such examples, the state of the metamorphic image may correspond with a progress indicator (such as a progress meter) that indicates a level of progress towards attaining the goal. Such implementations improve upon existing game design technology and may enhance player excitement by bringing a visual aspect of progressing to the goal to the main area that the player is looking at during game play. Game design technology also may be improved and player excitement also may be enhanced by tying together the state of a slot symbol metamorphic image with the state of the progress indicator, thereby providing multiple visual cues regarding the player's progress towards attaining the goal.

Figure 1:
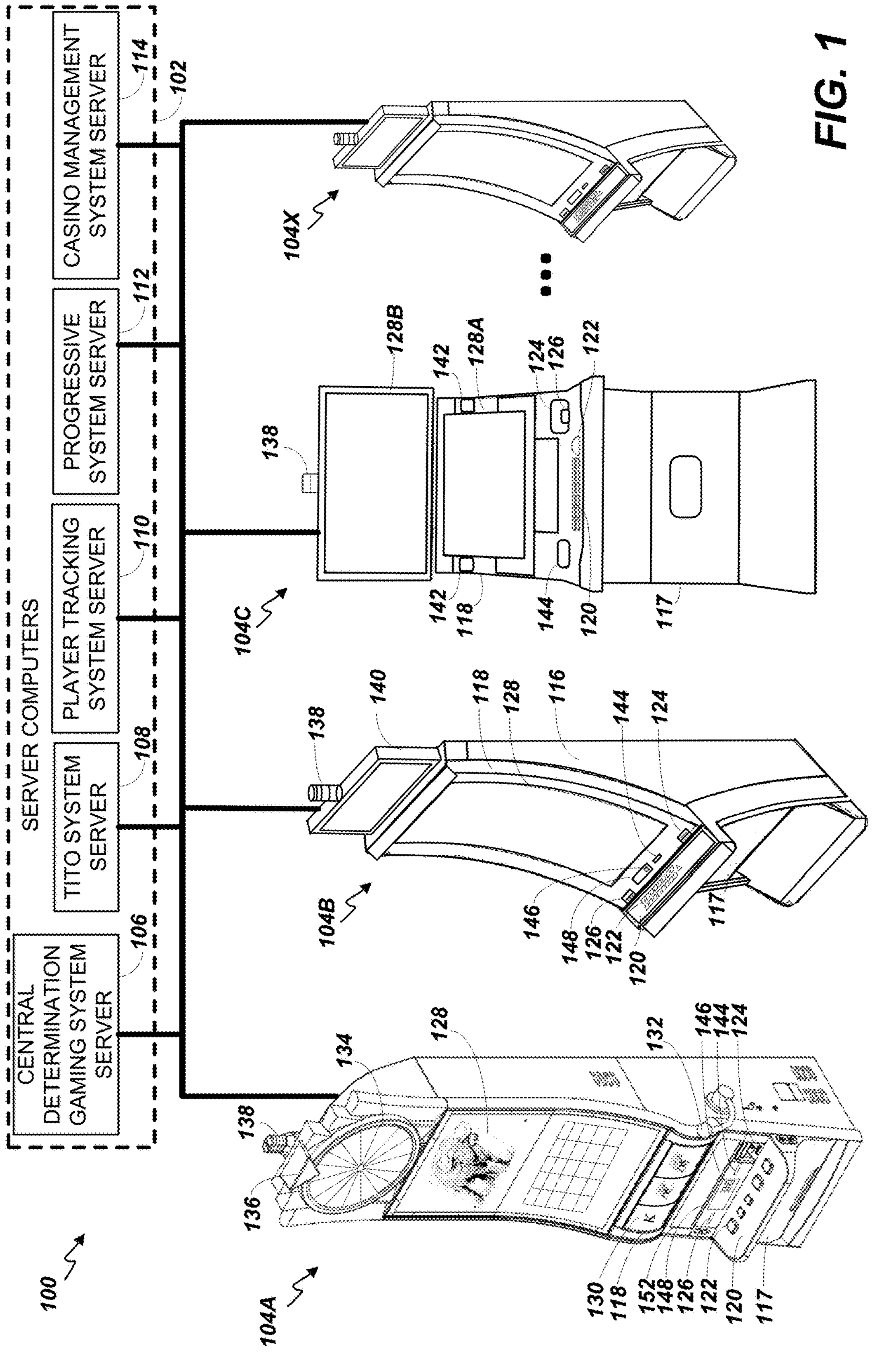
FIG. 1 is a diagram showing examples of several EGMs networked with various gaming related servers.

FIG. 1 illustrates several different models of EGMs which may be networked to various gaming related servers. Some implementations can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices. Some examples are described below.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, aspect of the present disclosure may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

Moreover, in some implementations at least some of the EGMs may be "thin-client" or "thick-client" EGMs that are not configured for stand-alone determination of game outcomes, etc. Such client EGMs may be configured for communication with one or more of the different server computers 102 described herein, including but not limited to the central determination gaming system server 106. Some such client EGMs may, for example, be configured to accept tickets and/or cash (e.g., via a bill validator that also functions as a ticket reader) to load credits onto the client EGM, a "ticket-out" printer for outputting a credit ticket when a cash out button is pressed, a player tracking card reader, etc. Some client EGMs may include a transceiver for wireless communication with a player's mobile device, (e.g., for communication with a player's smartphone, tablet and/or mobile gaming device) a keypad 146, and/or an illuminated display 148 for reading, receiving, entering, and/or displaying player tracking information. A client EGM may include a display system, an audio system, etc., for presenting attract sequences, game presentations, etc. The game presentations may include game outcomes determined by another device, such as the central determination gaming system server 106.

The server computers 102 may include a central determination gaming system server 106, a Class II bingo server (not shown), a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 117 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to present or determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor. The main display 128 may be a touchscreen display.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
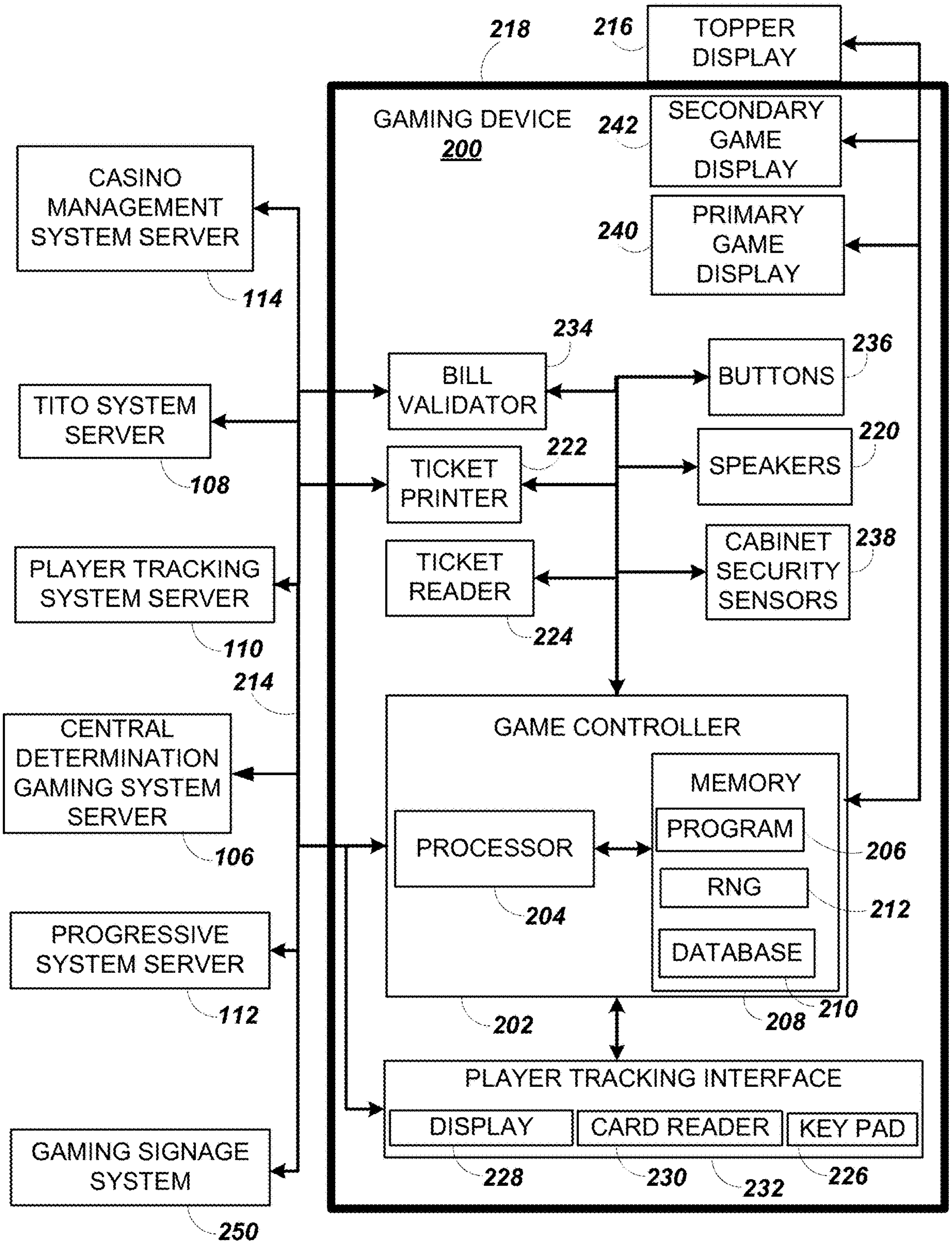
FIG. 2 is a block diagram showing examples of various functional elements of an EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing disclosed embodiments necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 117 which opens to provide access to the interior of the gaming device 104B. The main or service door 117 is typically used by service personnel to refill the ticket-out printer 126 and collect bills and tickets inserted into the bill validator 124. The door 117 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class II or Class III, etc.

FIG. 2 is a block diagram depicting examples of internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as the central determination gaming system server 106. The game instance may be communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), and a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

In this example, the gaming device 200 is also configured for communication with a gaming signage system 250 via the network 214. Various examples of gaming signage systems 250 are provided herein. According to some examples, the gaming signage system 250 may be configured for communication with other elements of a gaming system via the network 214, such as the central determination gaming system server 106, the progressive system server 112, the player tracking system server 110 the casino management system server 114 and/or the TITO system server 108.

When the player is done, he/she cashes out the credit balance (typically by pressing a cash out button to receive a ticket from the ticket printer 222). The ticket may be redeemed for money or inserted into another machine to establish a credit balance for play.

Figure 3:
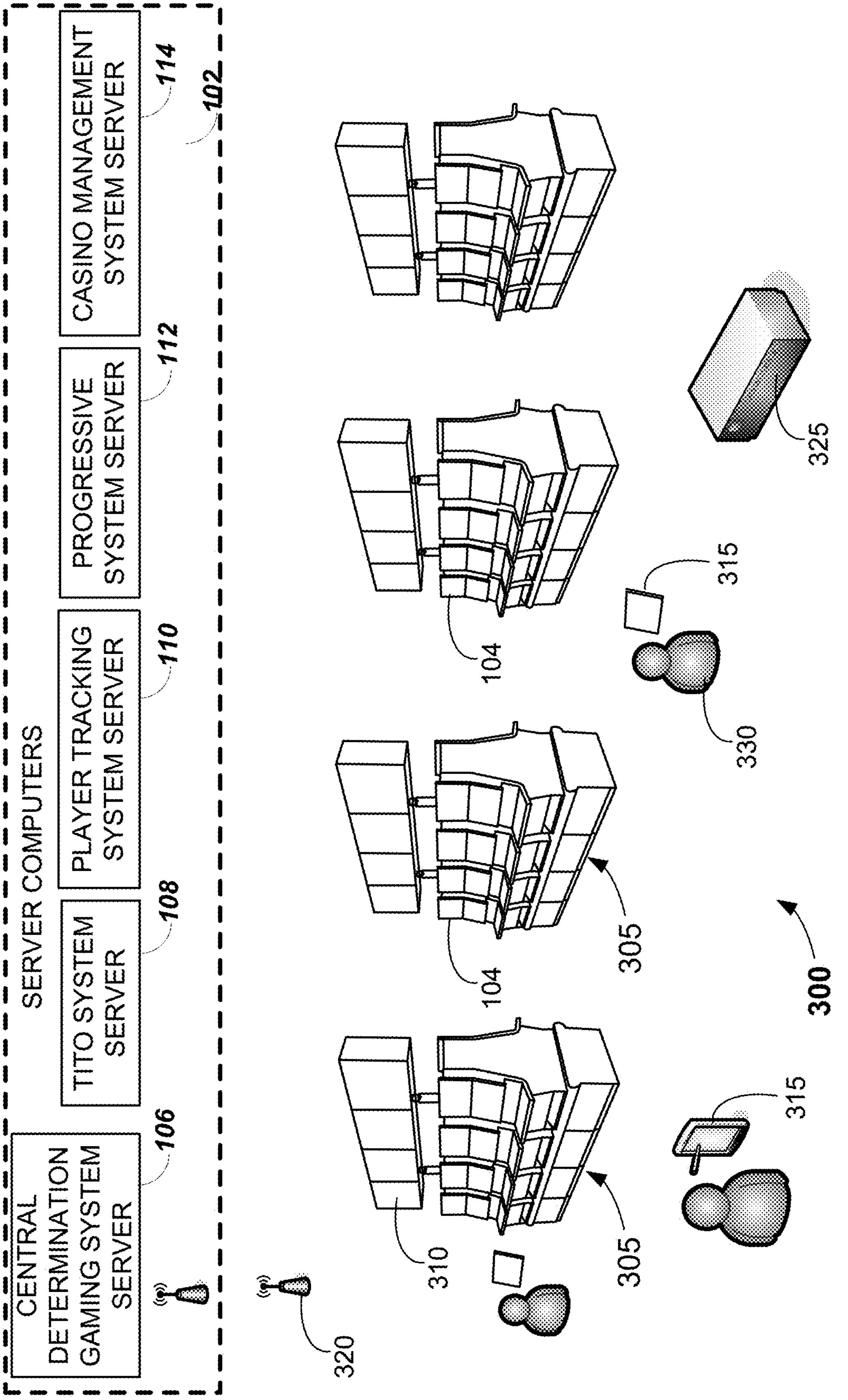
FIG. 3 depicts a casino gaming environment according to one example.

FIG. 3 depicts a casino gaming environment according to one example. In this example, the casino 300 includes banks 305 of EGMs 104. In this example, each bank 305 of EGMs 104 includes a corresponding gaming signage system 310. According to this implementation, the casino 300 also includes mobile gaming devices 315, which are also configured to present wagering games in this example. The mobile gaming devices 315 may, for example, include tablet devices, cellular phones, smart phones and/or other handheld devices. In this example, the mobile gaming devices 315 are configured for communication with one or more other devices in the casino 300, including but not limited to one or more of the server computers 102, via wireless access points 320.

According to some examples, the mobile gaming devices 315 may be configured for stand-alone determination of game outcomes. However, in some alternative implementations the mobile gaming devices 315 may be configured to receive game outcomes from another device, such as the central determination gaming system server 106, one of the EGMs 104, etc.

Some mobile gaming devices 315 may be configured to accept monetary credits from a credit or debit card, via a wireless interface (e.g., via a wireless payment app), via tickets, via a patron casino account, etc. However, some mobile gaming devices 315 may not be configured to accept monetary credits via a credit or debit card. Some mobile gaming devices 315 may include a ticket reader and/or a ticket printer whereas some mobile gaming devices 315 may not, depending on the particular implementation.

In some implementations, the casino 300 may include one or more kiosks 325 that are configured to facilitate monetary transactions involving the mobile gaming devices 315, which may include cash out and/or cash in transactions. The kiosks 325 may be configured for wired and/or wireless communication with the mobile gaming devices 315. The kiosks 325 may be configured to accept monetary credits from casino patrons 330 and/or to dispense monetary credits to casino patrons 330 via cash, a credit or debit card, via a wireless interface (e.g., via a wireless payment app), via tickets, etc. According to some examples, the kiosks 325 may be configured to accept monetary credits from a casino patron and to provide a corresponding amount of monetary credits to a mobile gaming device 315 for wagering purposes, e.g., via a wireless link such as a near-field communications link. In some such examples, when a casino patron 330 is ready to cash out, the casino patron 330 may select a cash out option provided by a mobile gaming device 315, which may include a real button or a virtual button (e.g., a button provided via a graphical user interface) in some instances. In some such examples, the mobile gaming device 315 may send a "cash out" signal to a kiosk 325 via a wireless link in response to receiving a "cash out" indication from a casino patron. The kiosk 325 may provide monetary credits to the patron 330 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 315 and/or a kiosk 325.

Some mobile gaming devices 315 may be configured for receiving and/or transmitting player loyalty information. For example, some mobile gaming devices 315 may be configured for wireless communication with the player tracking system server 110. Some mobile gaming devices 315 may be configured for receiving and/or transmitting player loyalty information via wireless communication with a patron's player loyalty card, a patron's smartphone, etc.

According to some implementations, a mobile gaming device 315 may be configured to provide safeguards that prevent the mobile gaming device 315 from being used by an unauthorized person. For example, some mobile gaming devices 315 may include one or more biometric sensors and may be configured to receive input via the biometric sensor(s) to verify the identity of an authorized patron. Some mobile gaming devices 315 may be configured to function only within a predetermined or configurable area, such as a casino gaming area.

Figure 4:
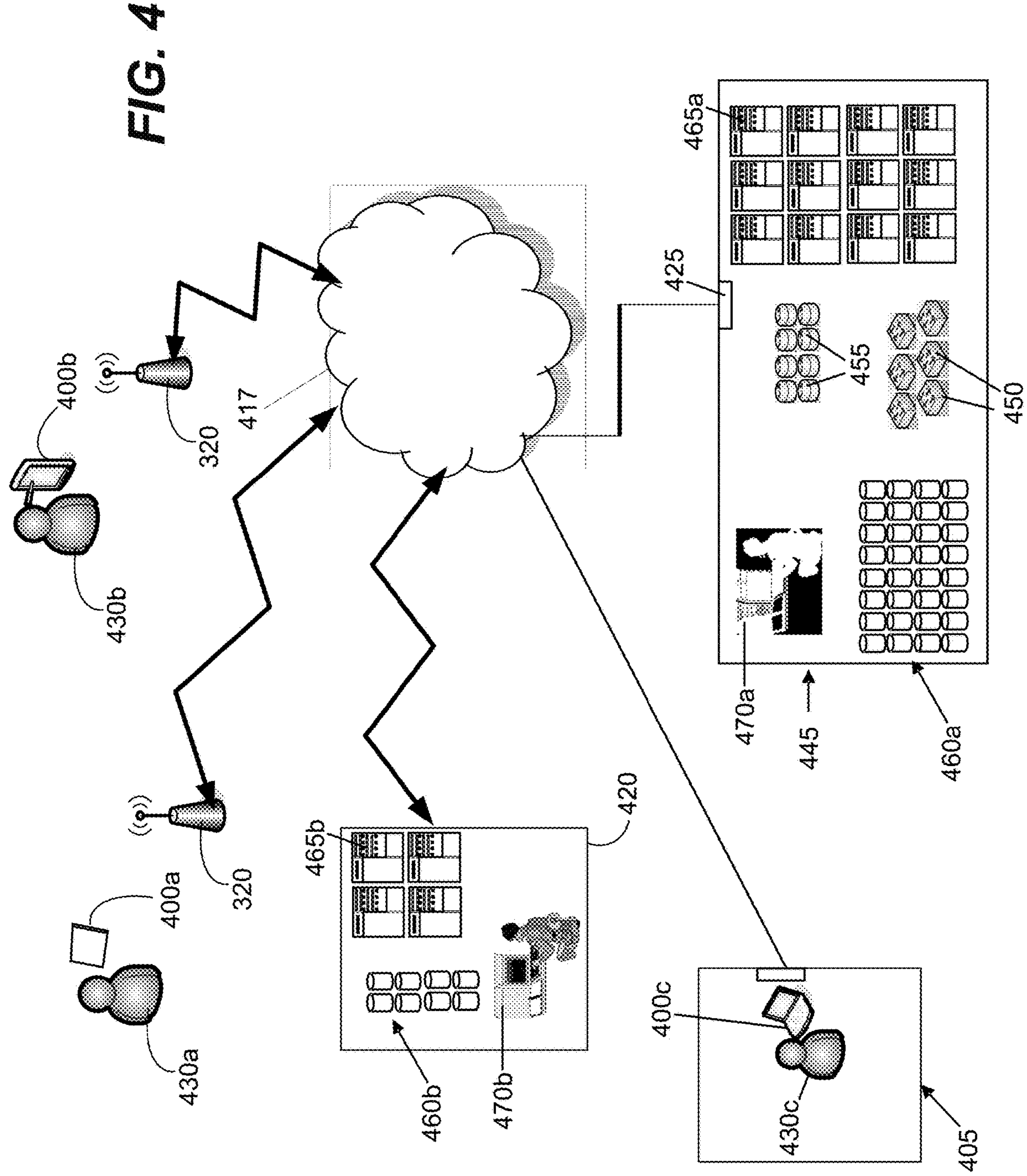
FIG. 4 is a diagram that shows examples of components of a system for providing online gaming according to some aspects of the present disclosure.

FIG. 4 is a diagram that shows examples of components of a system for providing online gaming according to some aspects of the present disclosure. As with other figures presented in this disclosure, the numbers, types and arrangements of gaming devices shown in FIG. 4 are merely shown by way of example. In this example, various gaming devices, including but not limited to end user devices (EUDs) 400*a*, 400*b* and 400*c* are capable of communication via one or more networks 417. The networks 417 may, for example, include one or more cellular telephone networks, the Internet, etc. In this example, the EUDs 400*a* and 400*b* are mobile devices: according to this example the EUD 400*a* is a tablet device and the EUD 400*b* is a smart phone. In this implementation, the EUD 400*c* is a laptop computer that is located within a residence 405 at the time depicted in FIG. 4. Accordingly, in this example the hardware of EUDs is not specifically configured for online gaming, although each EUD is configured with software for online gaming. Other implementations may include other types of EUD, some of which may be specifically configured for online gaming.

In this example, a gaming data center 445 includes various devices that are configured to provide online wagering games via the networks 417. The gaming data center 445 is capable of communication with the networks 417 via the gateway 425. In this example, switches 450 and routers 455 are configured to provide network connectivity for devices of the gaming data center 445, including storage devices 460*a*, servers 465*a* and one or more workstations 570*a*. The servers 465*a* may, for example, be configured to provide access to a library of games for online game play. In some examples, code for executing at least some of the games may initially be stored on one or more of the storage devices 460*a*. The code may be subsequently loaded onto a server 465*a* after selection by a player via an EUD and communication of that selection from the EUD via the networks 417. The server 465*a* onto which code for the selected game has been loaded may provide the game according to selections made by a player and indicated via the player's EUD. In other examples, code for executing at least some of the games may initially be stored on one or more of the servers 465*a*. Although only one gaming data center 445 is shown in FIG. 4, some implementations may include multiple gaming data centers 445.

In this example, a financial institution data center 420 is also configured for communication via the networks 417. Here, the financial institution data center 420 includes servers 465*b*, storage devices 460*b*, and one or more workstations 470*b*. According to this example, the financial institution data center 420 is configured to maintain financial accounts, such as checking accounts, savings accounts, loan accounts, etc. In some implementations one or more of the authorized users 430*a*-430*c* may maintain at least one financial account with the financial institution that is serviced via the financial institution data center 420.

According to some implementations, the gaming data center 445 may be configured to provide online wagering games in which money may be won or lost. According to some such implementations, one or more of the servers 465a may be configured to monitor player credit balances, which may be expressed in game credits, in currency units, or in any other appropriate manner. In some implementations, the server(s) 465*a* may be configured to obtain financial credits from and/or provide financial credits to one or more financial institutions, according to a player's "cash in" selections, wagering game results and a player's "cash out" instructions. According to some such implementations, the server (s) 465*a* may be configured to electronically credit or debit the account of a player that is maintained by a financial institution, e.g., an account that is maintained via the financial institution data center 420. The server(s) 465*a* may, in some examples, be configured to maintain an audit record of such transactions.

In some alternative implementations, the gaming data center 445 may be configured to provide online wagering games for which credits may not be exchanged for cash or the equivalent. In some such examples, players may purchase game credits for online game play, but may not "cash out" for monetary credit after a gaming session. Moreover, although the financial institution data center 420 and the gaming data center 445 include their own servers and storage devices in this example, in some examples the financial institution data center 420 and/or the gaming data center 445 may use offsite "cloud-based" servers and/or storage devices. In some alternative examples, the financial institution data center 420 and/or the gaming data center 445 may rely entirely on cloud-based servers.

One or more types of devices in the gaming data center 445 (or elsewhere) may be capable of executing middleware, e.g., for data management and/or device communication. Authentication information, player tracking information, etc., including but not limited to information obtained by EUDs 400 and/or other information regarding authorized users of EUDs 400 (including but not limited to the authorized users 430*a*-430*c*), may be stored on storage devices 460 and/or servers 465. Other game-related information and/or software, such as information and/or software relating to leaderboards, players currently playing a game, game themes, game-related promotions, game competitions, etc., also may be stored on storage devices 460 and/or servers 465. In some implementations, some such game-related software may be available as "apps" and may be downloadable (e.g., from the gaming data center 445) by authorized users.

In some examples, authorized users and/or entities (such as representatives of gaming regulatory authorities) may obtain gaming-related information via the gaming data center 445. One or more other devices (such EUDs 400 or devices of the gaming data center 445) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 5A:
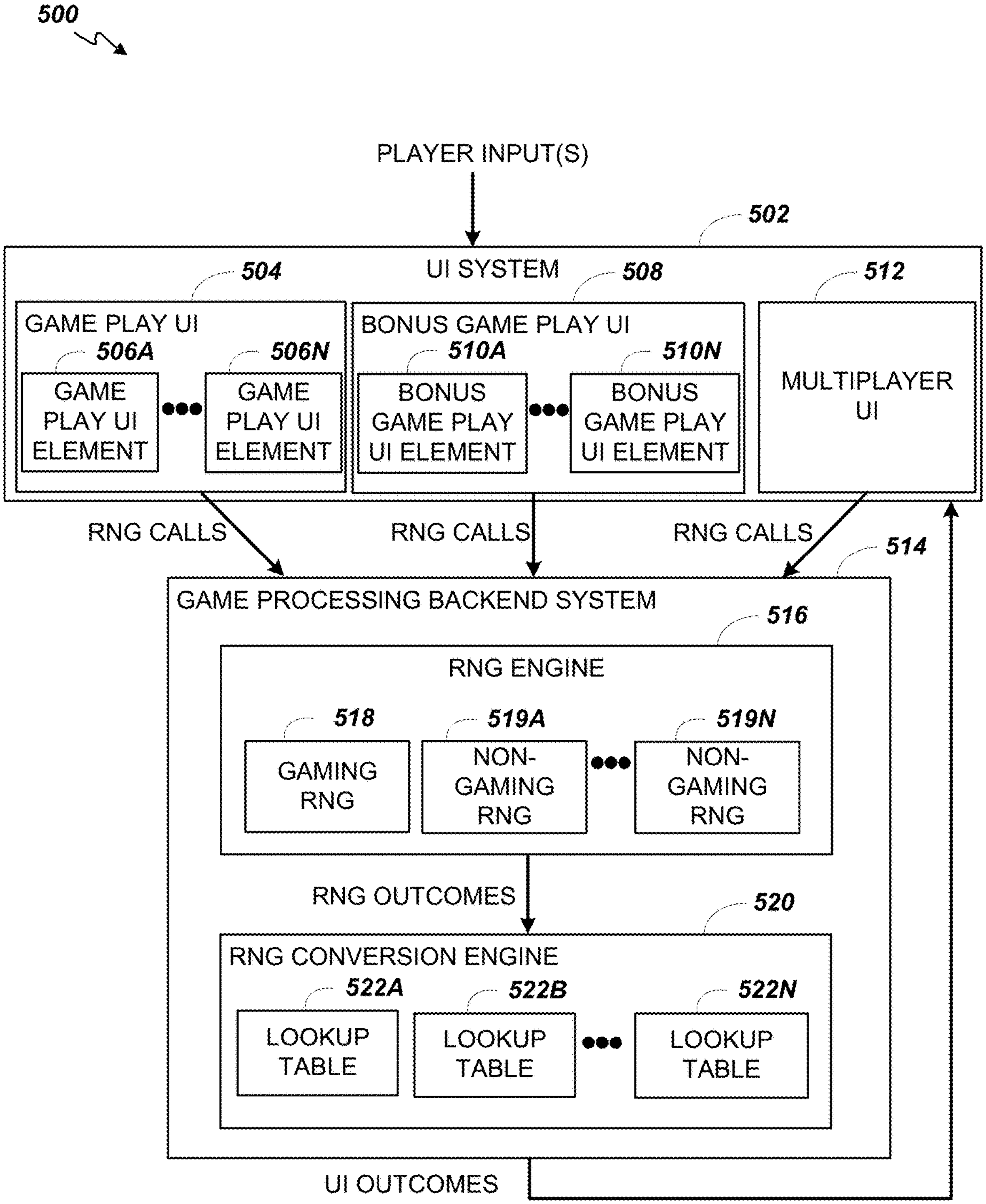
FIG. 5A illustrates, in block diagram form, an implementation of a game processing architecture that implements a game processing pipeline for the play of a game in accordance with various implementations described herein.

FIG. 5A illustrates, in block diagram form, an implementation of a game processing architecture 500 that implements a game processing pipeline for the play of a game in accordance with various implementations described herein. As shown in FIG. 5A, the gaming processing pipeline starts with having a UI system 502 receive one or more player inputs for the game instance. Based on the player input(s), the UI system 502 generates and sends one or more RNG calls to a game processing backend system 514. Game processing backend system 514 then processes the RNG calls with RNG engine 516 to generate one or more RNG outcomes. The RNG outcomes are then sent to the RNG conversion engine 520 to generate one or more game outcomes for the UI system 502 to display to a player. The game processing architecture 500 can implement the game processing pipeline using a gaming device, such as gaming devices 104A-104X and 200 shown in FIGS. 1 and 2A, respectively. Alternatively, portions of the gaming processing architecture 500 can implement the game processing pipeline using a gaming device and one or more remote gaming devices, such as central determination gaming system server 106 shown in FIG. 1.

The UI system 502 includes one or more UIs that a player can interact with. The UI system 502 could include one or more game play UIs 504, one or more bonus game play UIs 508, and one or more multiplayer UIs 512, where each UI type includes one or more mechanical UIs and/or graphical UIs (GUIs). In other words, game play UI 504, bonus game play UI 508, and the multiplayer UI 512 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 5A as an example, the different UI elements are shown as game play UI elements 506A-506N and bonus game play UI elements 510A-510N.

The game play UI 504 represents a UI that a player typically interfaces with for a base game. During a game instance of a base game, the game play UI elements 506A-506N (e.g., GUI elements depicting one or more virtual reels) are shown and/or made available to a user. In a subsequent game instance, the UI system 502 could transition out of the base game to one or more bonus games. The bonus game play UI 508 represents a UI that utilizes bonus game play UI elements 510A-510N for a player to interact with and/or view during a bonus game. In one or more implementations, at least some of the game play UI element 506A-506N are similar to the bonus game play UI elements 510A-510N. In other implementations, the game play UI element 506A-506N can differ from the bonus game play UI elements 510A-510N.

FIG. 5A also illustrates that UI system 502 could include a multiplayer UI 512 purposed for game play that differs or is separate from the typical base game. For example, multiplayer UI 512 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 516 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 5A does not explicitly depict that multiplayer UI 512 includes UI elements, multiplayer UI 512 could also include one or more multiplayer UI elements.

Based on the player inputs, the UI system 502 could generate RNG calls to a game processing backend system 514. As an example, the UI system 502 could use one or more application programming interfaces (APIs) to generate the RNG calls. To process the RNG calls, the RNG engine 516 could utilize gaming RNG 518 and/or non-gaming RNGs 519A-519N. Gaming RNG 518 could corresponds to RNG 212 or hardware RNG 244 shown in FIG. 2. As previously discussed with reference to FIG. 2, gaming RNG 518 often performs specialized and non-generic operations that comply with regulatory and/or game requirements. For example, because of regulation requirements, gaming RNG 518 could correspond to RNG 212 by being a cryptographic RNG or pseudorandom number generator (PRNG) (e.g., Fortuna PRNG) that securely produces random numbers for one or more game features. To securely generate random numbers, gaming RNG 518 could collect random data from various sources of entropy, such as from an operating system (OS) and/or a hardware RNG (e.g., hardware RNG 244 shown in FIG. 2). Alternatively, non-gaming RNGs 519A-519N may not be cryptographically secure and/or be computationally less expensive. Non-gaming RNGs 519A-519N can, thus, be used to generate outcomes for non-gaming purposes. As an example, non-gaming RNGs 519A-519N can generate random numbers for generating random messages that appear on the gaming device.

The RNG conversion engine 520 processes each RNG outcome from RNG engine 516 and converts the RNG outcome to a UI outcome that is feedback to the UI system 502. With reference to FIG. 2, RNG conversion engine 520 corresponds to RNG conversion engine 210 used for game play. As previously described, RNG conversion engine 520 translates the RNG outcome from the RNG 212 to a game outcome presented to a player. RNG conversion engine 520 utilizes one or more lookup tables 522A-522N to regulate a prize payout amount for each RNG outcome and how often the gaming device pays out the derived prize payout amounts. In one example, the RNG conversion engine 520 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 514 sends the UI outcome to the UI system 502. Examples of UI outcomes are symbols to display on a video reel or reel stops for a mechanical reel. In one example, if the UI outcome is for a base game, the UI system 502 updates one or more game play UI elements 506A-506N, such as symbols, for the game play UI 504. In another example, if the UI outcome is for a bonus game, the UI system could update one or more bonus game play UI elements 510A-510N (e.g., symbols) for the bonus game play UI 508. In response to updating the appropriate UI, the player may subsequently provide additional player inputs to initiate a subsequent game instance that progresses through the game processing pipeline.

According to some examples, user input (e.g., player input) may be received for initiation of an instance of a slot game. Based on the player inputs, the UI system 502 may generate and send one or more RNG calls to the game processing backend system 514. The game processing backend system 514 may then process the RNG calls with RNG engine 516 to generate one or more RNG outcomes. The RNG outcomes may then be sent to the RNG conversion engine 520 to generate one or more game outcomes and corresponding display symbols for the UI system 502 to display to a player. The game outcome(s) may include an award determination. In some instances, at least one of the display symbols may be a first metamorphic display symbol that includes a first metamorphic image. A state of the first metamorphic image may correspond to a level of progress towards attaining a goal. In some examples, the game processing architecture 500 may implement the game processing pipeline using a gaming device, such as any of the gaming devices disclosed herein. Alternatively, portions of the gaming processing architecture 500 can implement the game processing pipeline using a gaming device and one or more remote gaming devices, such as a server of the gaming data center 445 shown in FIG. 4 or the central determination gaming system server 106 shown in FIG. 1.

Some games involve what is sometimes referred to as a "metamorphic," a "game metamorphic," a "metamorphic image," a "metamorphic meter," etc., which change or metamorphose over time in response to gaming events. In some wagering game examples, a metamorphic image may change in response to the increasing value of a progressive. In some such examples, a metamorphic image may change in response to the increasing value indicated on a progressive meter. For example, a metamorphic image may increase in size in accordance with an increasingly larger value indicated on a progressive meter. Alternatively, or additionally, a metamorphic image may change color in accordance with an increasingly larger value indicated on a progressive meter. For example, the metamorphic image may change from a relatively "cooler" color (such as green or blue) to a relatively "hotter" color (such as yellow, orange or red) in accordance with an increasingly larger value indicated on a progressive meter.

Players like some aspects of existing wagering games that involve metamorphic images. For example, changes in the metamorphic image may enhance player excitement, because the increasing value of a progressive may be indicated not merely by a larger number, but also by a changing image to which the player may respond in a relatively more intuitive manner. Accordingly, existing wagering games that involve one or more metamorphic images can provide benefits both to players and to casinos.

However, some players find other aspects of existing wagering games that involve metamorphic images to be less than optimal. For example, metamorphic images have previously been presented outside a display area in which game outcomes are presented. In some such instances, metamorphic images have previously been presented in an area above the display area in which game outcomes are presented.

Particular aspects of the subject matter described in this disclosure can be implemented to realize one or more of the following potential advantages. In some implementations, a metamorphic image may be presented on one or more types of slot symbols. At least one type of slot symbol may include a metamorphic image having a state that corresponds to a level of progress towards attaining a goal. In some instances, the goal may be a feature presentation, which may include one or more bonus games. According to some such implementations, progress towards the goal may be based, at least in part, in the number of occurrences of the slot symbol that includes a particular type of metamorphic image. In some such examples, the state of the metamorphic image may correspond with a progress indicator, such as a progress meter, that indicates a level of progress towards attaining the goal.

Such implementations may enhance player excitement by bringing a visual aspect of progressing to the goal to the main area that the player is looking at during game play. Player excitement also may be enhanced by tying together the state of a slot symbol metamorphic image with the state of the progress indicator, thereby providing multiple visual cues regarding the player's progress towards attaining the goal.

Figure 5B:
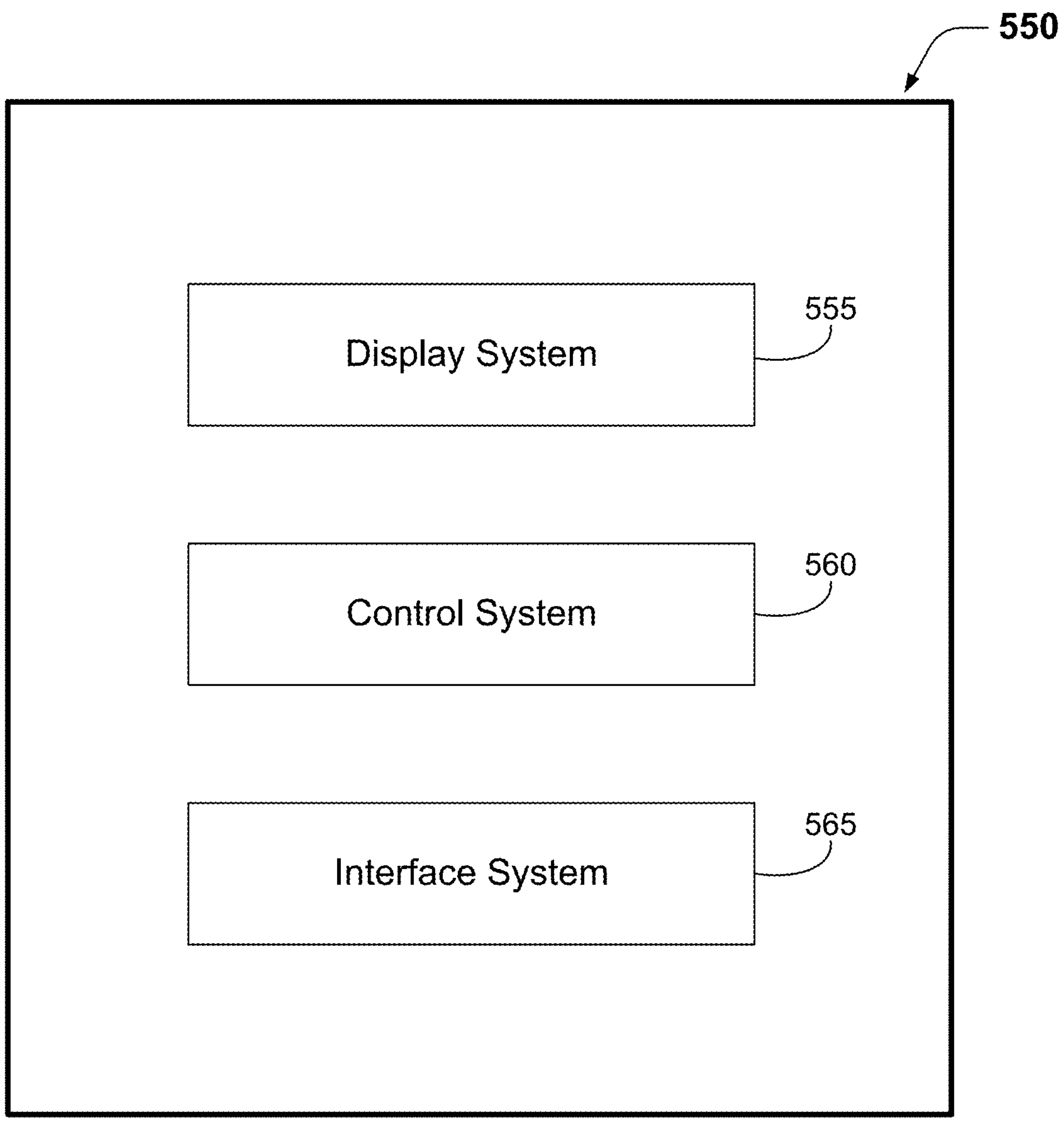
FIG. 5B is a block diagram that shows blocks of an apparatus according to one example.

FIG. 5B is a block diagram that shows blocks of an apparatus according to one example. According to some examples, the apparatus 550 may be, or may include, a gaming device. In some examples, the apparatus 550 may be an EGM such as those described above with reference to FIGS. 1 and 2. However, in alternative examples, the apparatus 550 may be a mobile device such as described above with reference to FIG. 3 or an EUD as described above with reference to FIG. 4. In this example, the apparatus 550 includes a display system 555 and a control system 560 that is configured to communicate with the display system 555. In this example, the control system 560 is configured to communicate with the display system 555 via wired communication, e.g., via electrical signals. In alternative implementations, the control system 560 may be configured to communicate with the display system 555 via wireless communication. Accordingly, at least a portion of the control system 560 may be coupled to the display system 555. As used herein, the term "coupled to" has a meaning that could include being physically coupled for wired communication or being configured for wireless communication.

The control system 560 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. Although the interface system 565 is shown as being separate from the control system 560, in some implementations the interface system 565 may be part of the control system 560. In some implementations, the interface system 565 may include the entire control system 560. The control system 560 also may include (and/or be configured for communication with) one or more memory devices, such as one or more random access memory (RAM) devices, read-only memory (ROM) devices and/or other types of non-transitory media. In some implementations, at least a portion of the control system 560 may be implemented as a register.

Accordingly, the apparatus 550 may have a memory system that includes one or more memory devices, though the memory system is not shown in FIG. 5B.

The control system 560 may be capable of performing, at least in part, the methods disclosed herein. In some examples, the control system 560 may be capable of performing at least some of the methods described herein according to instructions (e.g., software) stored on non-transitory media. For example, the control system 560 may be configured for controlling the display system 555 and/or for receiving and processing data from at least a portion of the display system 555, e.g., as described below.

The display system 555 may include, one or more liquid crystal displays (LCDs), plasma displays, light-emitting diode (LED) displays, microLED displays or organic light-emitting diode (OLED) displays. According to some implementations, the display system 555 may include at least one flexible display, such as a flexible OLED. Although shown as separate components in FIG. 5B, the display system 555 may, in some examples, include at least a portion of the control system 560. For example, the display system 555 may include one or more processors, microprocessors, programmable logic devices, discrete gates or transistor logic, etc.

In the example shown in FIG. 5B, the apparatus 550 includes an interface system 565. In some examples, the interface system may include a wireless interface system. In some implementations, the interface system 565 may include a network interface, an interface between the control system 560 and the display system 555, an interface between the control system 560 and a memory system and/or an interface between the control system 560 and an external device interface (e.g., a port or an applications processor). In some examples, the interface system 565 may include one or more user interfaces, such as a touch screen, one or more buttons, a gesture recognition system, a voice recognition system, etc.

According to some implementations, the apparatus 550 may be a single device, whereas in other implementations the apparatus 550 may be a system that includes more than one device. Accordingly, the terms "apparatus" and "system" may sometimes be used interchangeably herein. In other examples, the apparatus 550 may be a component of another device. For example, in some implementations at least a portion of the display system 555 and/or the control system 560 may be included in more than one apparatus. For example, in some implementations at least part of the control system 560 may reside in a server, such as a central determination server, a server that tracks feature award credits, etc.

Figure 6:
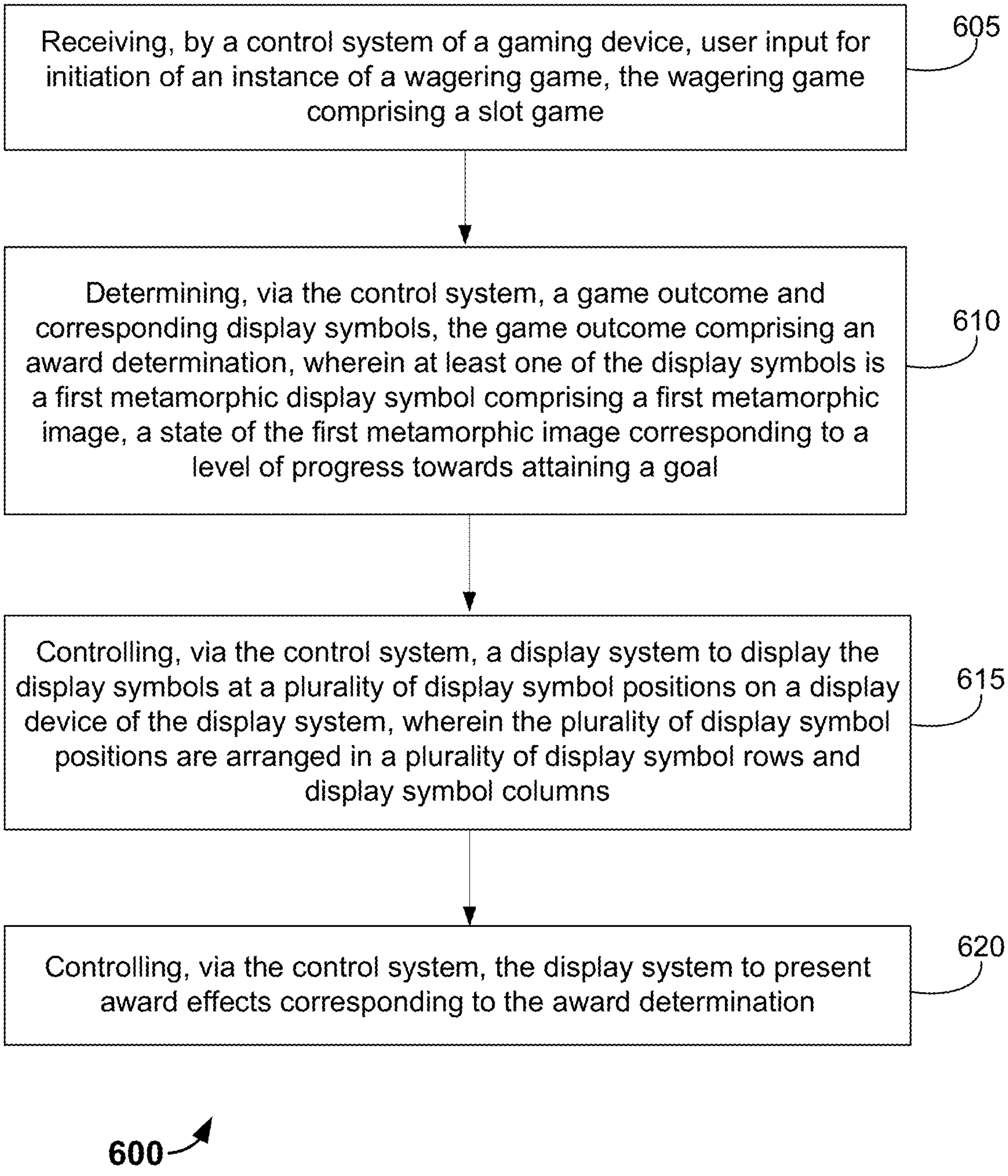
FIG. 6 is a flow diagram that shows blocks of a method according to one example.

FIG. 6 is a flow diagram that shows blocks of a method according to one example. In some examples method 600 may be performed, at least in part, by an apparatus such as that described above with reference to FIG. 5B. In some examples, the method 600 may be performed by a control system (e.g., the control system 560 of FIG. 5B) according to software stored upon one or more non-transitory storage media. As with other methods described herein, the number and sequence of blocks shown in FIG. 6 are merely examples. Similar disclosed methods may include more or fewer blocks. Moreover, at least some of the blocks may occur in a different sequence than the sequence that is shown in a flow diagram.

According to this example, block 605 involves receiving, by a control system of a gaming device, user input for initiation of an instance of a wagering game. In this example, the wagering game is a slot game.

In this example, block 610 involves determining, via the control system, a game outcome and corresponding display symbols. According to this example, the game outcome includes an award determination and at least one of the display symbols is a first metamorphic display symbol that includes a first metamorphic image. In this implementation, a state of the first metamorphic image corresponds to a level of progress towards attaining a goal. Some examples of metamorphic images are described below with reference to FIGS. 7-10. In some examples, the goal may be, or may include, a feature presentation. The feature presentation may include an award of one or more bonus games. The goal may, for example, be (or may include) a credit award, such as a progressive jackpot award. However, in some examples the goal may be, or may include, a fixed-credit award.

As used herein, the "state" of the metamorphic image includes visual characteristics of the metamorphic image at a particular time. Various examples are provided in this disclosure. As the metamorphic image changes, its state changes. The state changes depend on the particular type of metamorphic image and the particular implementation. For example, if a metamorphic image includes a string of firecrackers, the state of the metamorphic image may be indicated, at least in part, by how many firecrackers in the string of firecrackers currently have lit fuses. If changes to the metamorphic image include a change in size and/or shape of the metamorphic image, the state of the metamorphic image may correspond, at least in part, to the current size and/or shape of the metamorphic image. If a metamorphic image includes a sector of a circle, the state of the metamorphic image may correspond, at least in part, to the current size of the sector.

In some implementations, method 600 may involve controlling the display system to display one or more progress indicators corresponding to the level of progress towards attaining the goal. In some instances, the one or more progress indicators may be displayed separately from the first metamorphic display symbol. For example, the control system may be configured for controlling the display system to display the display symbol positions in a first area and to display the one or more progress indicators in a second area. In some examples, the one or more progress indicators may be, or may include, a progress meter. According to some such implementations, the state of the first metamorphic image corresponds with the state of the progress meter.

According to some implementations, the one or more progress indicators may be, or may include, a plurality of images arranged between adjacent display symbol columns or adjacent display symbol rows. In some such examples, the number of illuminated instances of the plurality of images may correspond to the level of progress towards attaining the goal. In other words, the number of instances that appear to be "lit up," as compared to the number of instances that do not appear to be lit up, may indicate the level of progress towards attaining the goal. According to some implementations, the plurality of images may be arranged on two sides of a display symbol column or a display symbol row. In some examples, instances of the plurality of images may be arranged from a bottom to a top of a display symbol column. According to some implementations, the control system may be configured for controlling the display system to display an award corresponding to the goal at the top of a display symbol column and/or at one end of a display symbol row.

According to this example, block 615 involves controlling, via the control system, the display system to display the display symbols at a plurality of display symbol positions on a display device of the display system. In this implementation, the display symbol positions are arranged in a plurality of display symbol rows and display symbol columns.

According to this example, block 620 involves controlling, via the control system, the display system to present award effects corresponding to the award determination. For example, if it is determined in block 610 that a credit award corresponding to the game outcome will be granted, block 620 may involve updating a credit meter display of the gaming device to indicate the credit award. In some such examples, if it is determined in block 610 that a credit award will be granted, block 620 may involve presenting images corresponding to a celebration of the award, such as a congratulatory message, a display of showering coins, etc. However, in some instances it may be determined in block 610 that no credit award will be granted. In some such instances, block 620 may involve updating a credit meter display of the gaming device to indicate a reduced credit balance corresponding to the wager amount of a particular game instance.

In some implementations, the level of progress towards attaining the goal may correspond with a number of instances during which the first metamorphic display symbol is presented as part of a game outcome. For example, attaining the goal may require a number of the first metamorphic display symbols to be selected and presented.

In some instances, the number of first metamorphic display symbols required to attain the goal may only be achievable during more than one instance of a wagering game. Accordingly, in such implementations, attaining the goal may require an initiation of multiple wagering game instances. However, because game outcomes are randomly determined, the particular number of required wagering game instances may not be knowable in advance.

Figure 7:
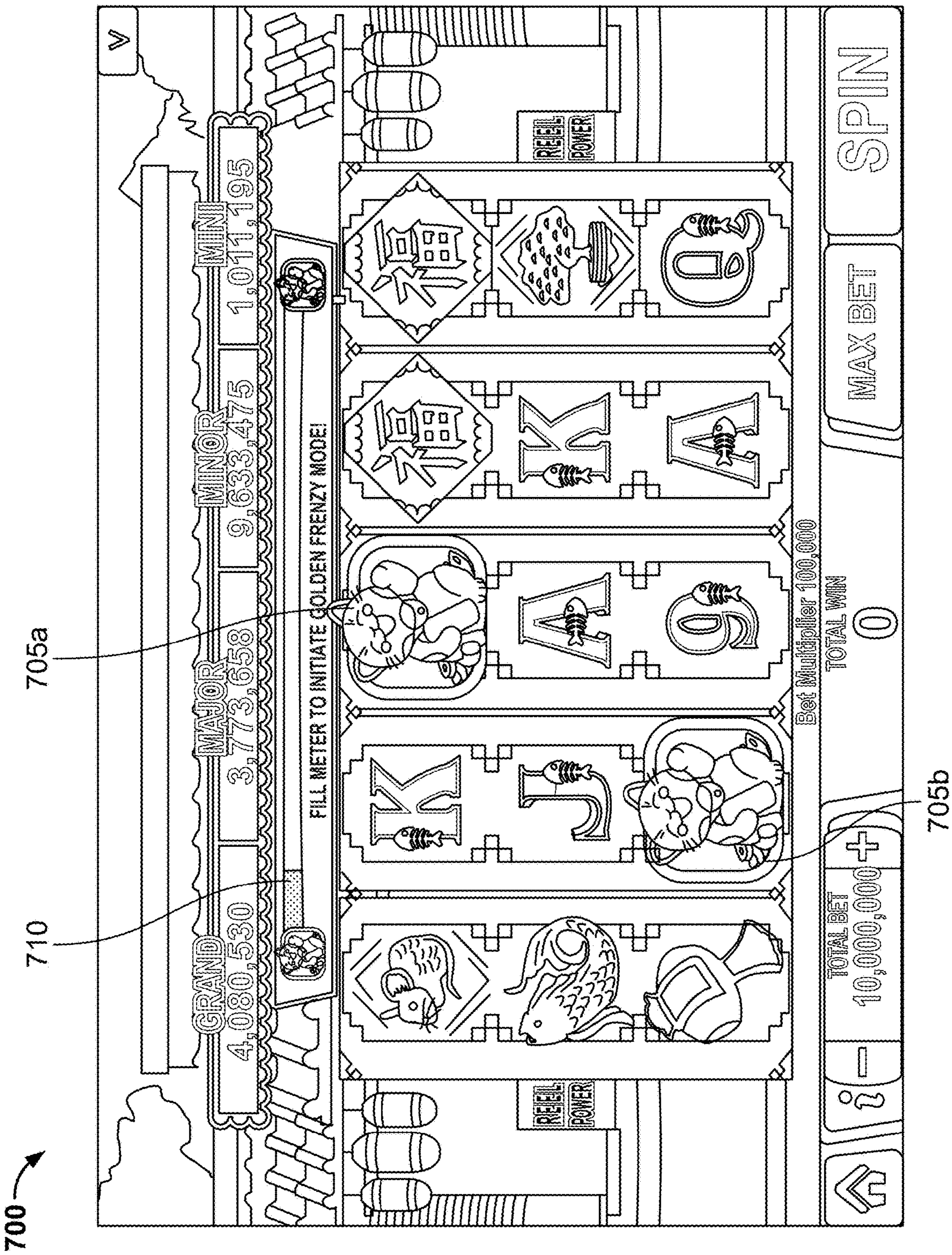
FIG. 7 shows an example of a game display that includes metamorphic images.

FIG. 7 shows an example of a game display that includes metamorphic images. FIG. 7 shows an example of a display of display symbols corresponding with a game outcome. In this example, the display symbols include metamorphic display symbol 705*a* and metamorphic display symbol 705*b*, both of which include corresponding metamorphic images. Accordingly, FIG. 7 shows an example of a display that may be presented in block 615 of FIG. 6. The metamorphic display symbols 705*a* and 705*b* are examples of the "first metamorphic display symbol" that is discussed above with reference to FIG. 6. In other implementations, different types of metamorphic display symbols may be presented.

In this implementation, the number of coins shown in the metamorphic display symbols 705*a* and 705*b* indicates the state of the metamorphic display symbols 705*a* and 705*b*. (The state of a metamorphic display symbol corresponds with the state of a metamorphic image shown on the metamorphic display symbol.) According to this example, the state of the progress indicator 710 (which is a progress meter in this instance) corresponds with the states of the metamorphic display symbols 705*a* and 705*b*. In this example, the state of the progress indicator 710 and the states of the metamorphic display symbols 705*a* and 705*b* both correspond with the level of progress towards attaining a goal, which is a feature presentation in this example.

Figure 8:
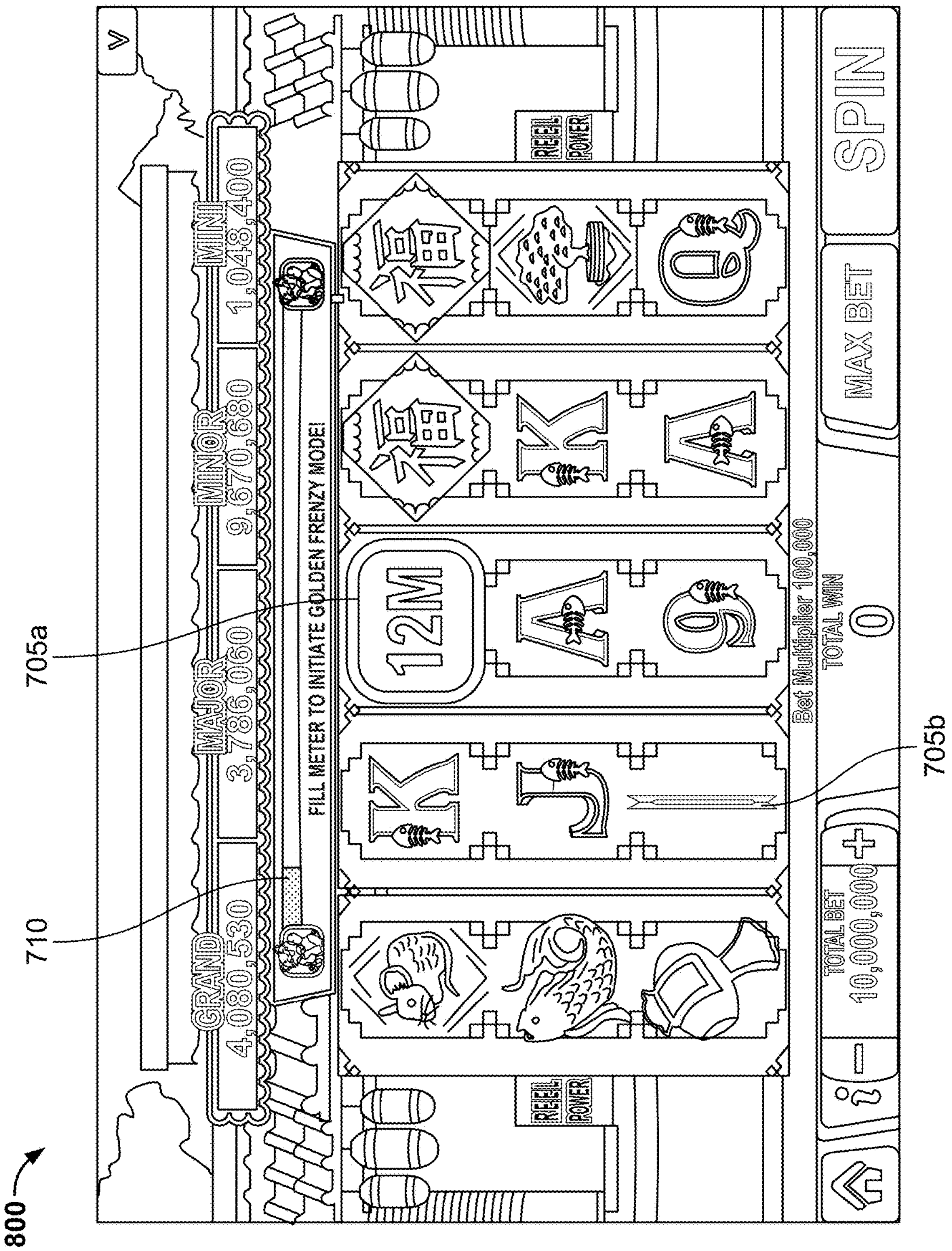
FIG. 8 shows another example of a game display that includes metamorphic images.

FIG. 8 shows another example of a game display that includes metamorphic images. In this example, FIG. 8 shows an example of the same game outcome displayed in FIG. 7, but at a time after the time at which the display of FIG. 7 was shown. At the time depicted in FIG. 8, the metamorphic display symbol 705*a* has been rotated to show an opposite side (which may also referred to herein as the "back" or the "back side") that was hidden in FIG. 7. In practice, a control system has controlled a display system to display a sequence of images corresponding to a rotation of the metamorphic display symbol 705*a*. In this example, the back side of the metamorphic display symbol 705*a* indicates an award of 12M, or 12 million, credits. At the time depicted in FIG. 8, the metamorphic display symbol 705*b* is in the process of being rotated, so that an image of the side edge the metamorphic display symbol 705*b* is shown.

Figure 9:
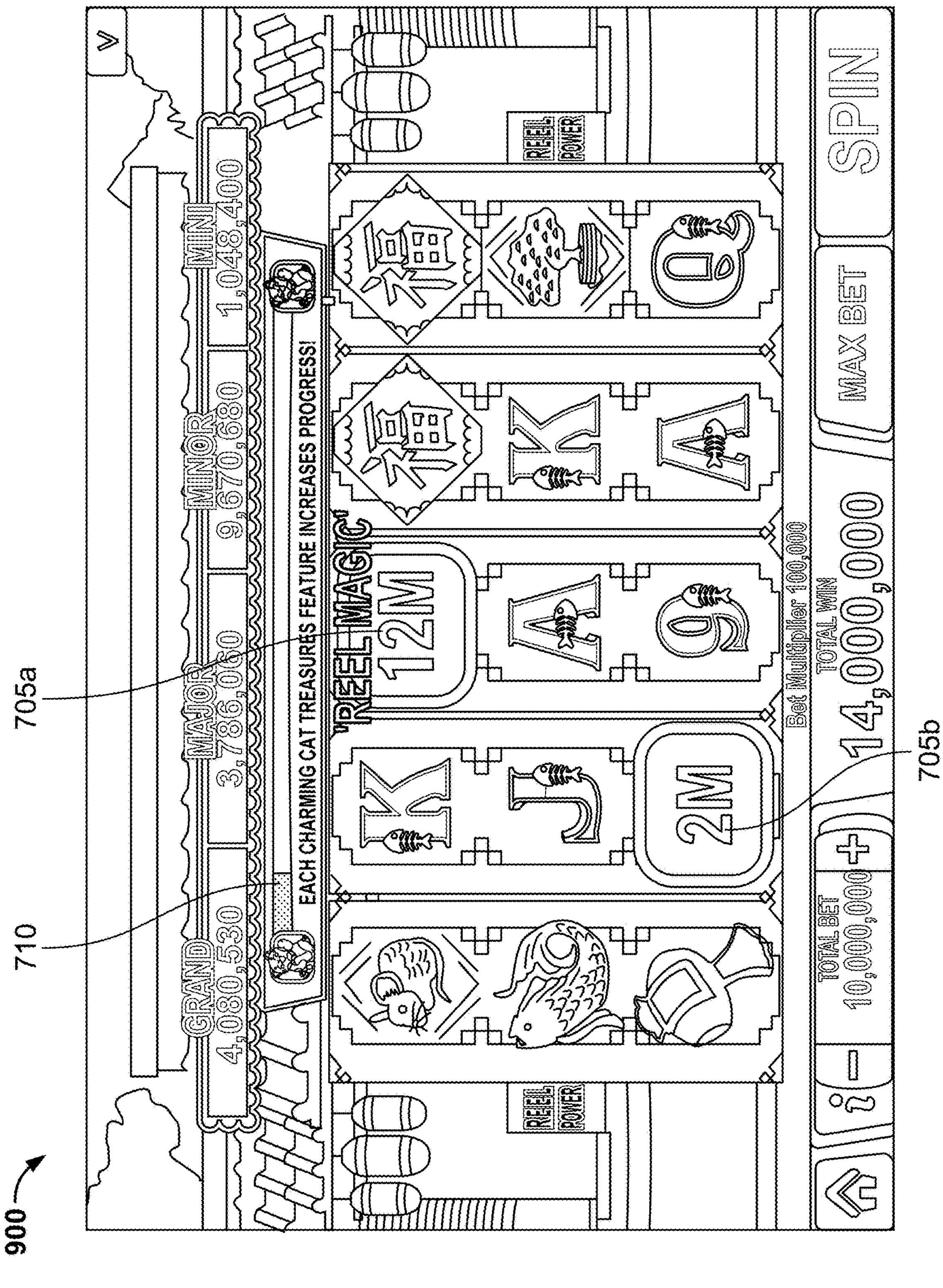
FIG. 9 shows another example of a game display that includes metamorphic images.

FIG. 9 shows another example of a game display that includes metamorphic images. In this example, FIG. 9 shows an example of the same game outcome displayed in FIG. 8, but at a time after the time at which the display of FIG. 8 was shown. At the time depicted in FIG. 8, the metamorphic display symbol 705*b* has been rotated to show a back side that was hidden in FIGS. 7 and 8. In practice, a control system has controlled a display system to display a sequence of images corresponding to a rotation of the metamorphic display symbol 705*b*. In this example, the back side of the metamorphic display symbol 705*b* indicates an award of 2M, or 2 million, credits.

Figure 10:
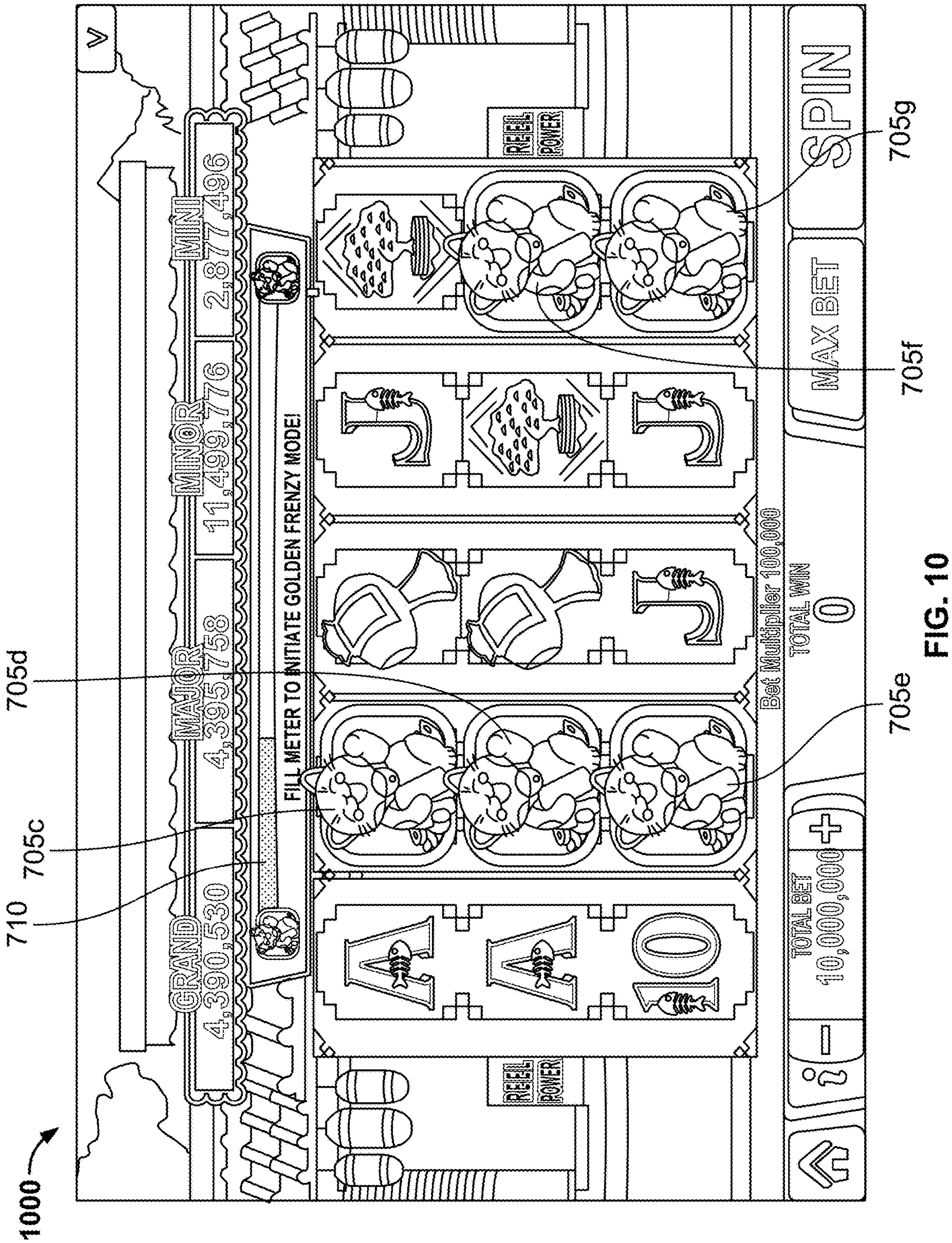
FIG. 10 shows another example of a game display that includes metamorphic images.

FIG. 10 shows another example of a game display that includes metamorphic images. In this example, FIG. 10 shows an example of a game outcome that is displayed after the game outcome that is depicted in FIGS. 7-9. At the time depicted in FIG. 10, metamorphic display symbols 705*c*-705*g* are being displayed. It may be observed that the number of coins shown in the metamorphic display symbols 705*c*-705*g* is greater than the number of coins shown in the metamorphic display symbols 705*a* and 705*b*. This indicates that a relatively higher level of progress towards attaining a goal has been attained at the time depicted in FIG. 10.

According to this example, the state of the progress indicator 710 corresponds with the states of the metamorphic display symbols 705*c*-705*g*. In this example, the state of the progress indicator 710 and the states of the metamorphic display symbols 705*c*-705*g* both correspond with the level of progress towards attaining a goal, which is a feature presentation in this example. According to this implementation, a control system will subsequently control a display system to display a sequence of images corresponding to a rotation of the metamorphic display symbols 705*c*-705*g*, to reveal awards on their back sides.

In some implementations, a relative value of a metamorphic display symbol award may correspond to the state of the metamorphic image. According to some such implementations, a relatively more advanced or "higher" state of the metamorphic image will correspond with relatively higher-level awards. For example, if the metamorphic image is in a first, lower state the maximum award may be 15 million credits, whereas if the metamorphic image is in a second, higher state the maximum award may be 20 million credits, 25 million credits, etc. In some such examples, a relatively more advanced or "higher" state of the metamorphic image will correspond with a higher probability that the metamorphic display symbol will include a relatively higher-level award. For example, if the metamorphic image is in a first, lower state there may be a 10% chance that the metamorphic display symbol will include a 25 million credit award, whereas if the metamorphic image is in a second, higher state there may be a 20% chance that the metamorphic display symbol will include a 25 million credit award.

In some implementations, more than one type of metamorphic display symbol may be presented. According to some such examples, at least one of the display symbols determined in block 610 may be a second metamorphic display symbol that includes a second metamorphic image. The first metamorphic display symbol may be a first type of metamorphic display symbol (such as the type of metamorphic display symbol shown in FIGS. 7-10) and the second metamorphic display symbol may be a second type of metamorphic display symbol (such as a string of firecrackers, a gong, a dragon, etc.). According to some implementations, the second metamorphic display symbol may also indicate an award. In some such implementations, a relative value of the second metamorphic display symbol award may correspond to a state of the second metamorphic image.

Figure 11:
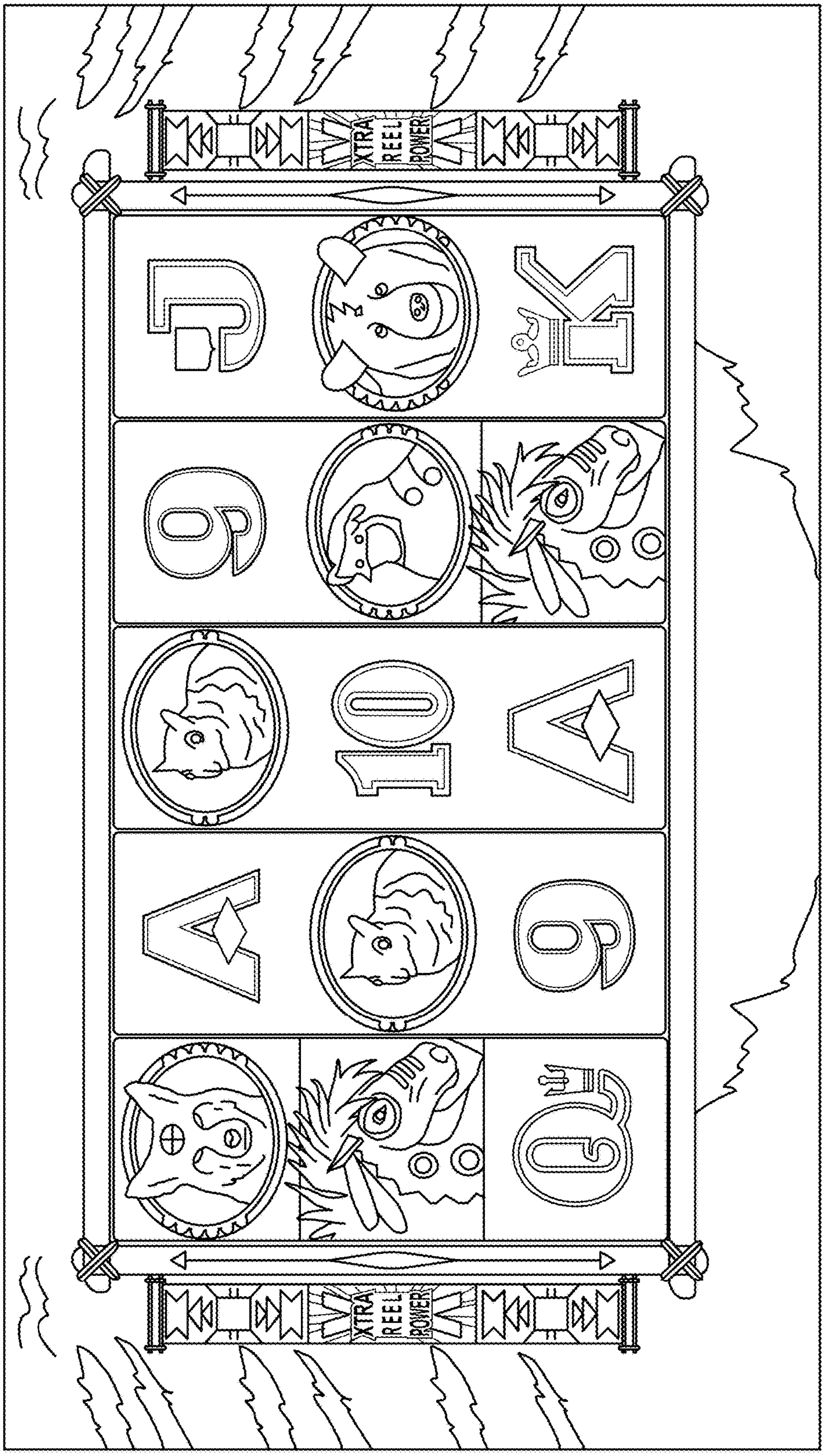
FIG. 11 shows an example of a display of display symbols corresponding with a game outcome for another type of slot game.

FIG. 11 shows an example of a display of display symbols corresponding with a game outcome for another type of slot game. In this example, the slot game has a "Western" theme. According to this example, the display symbols of the game outcome 1100 do not include any metamorphic display symbols.

Figure 12:
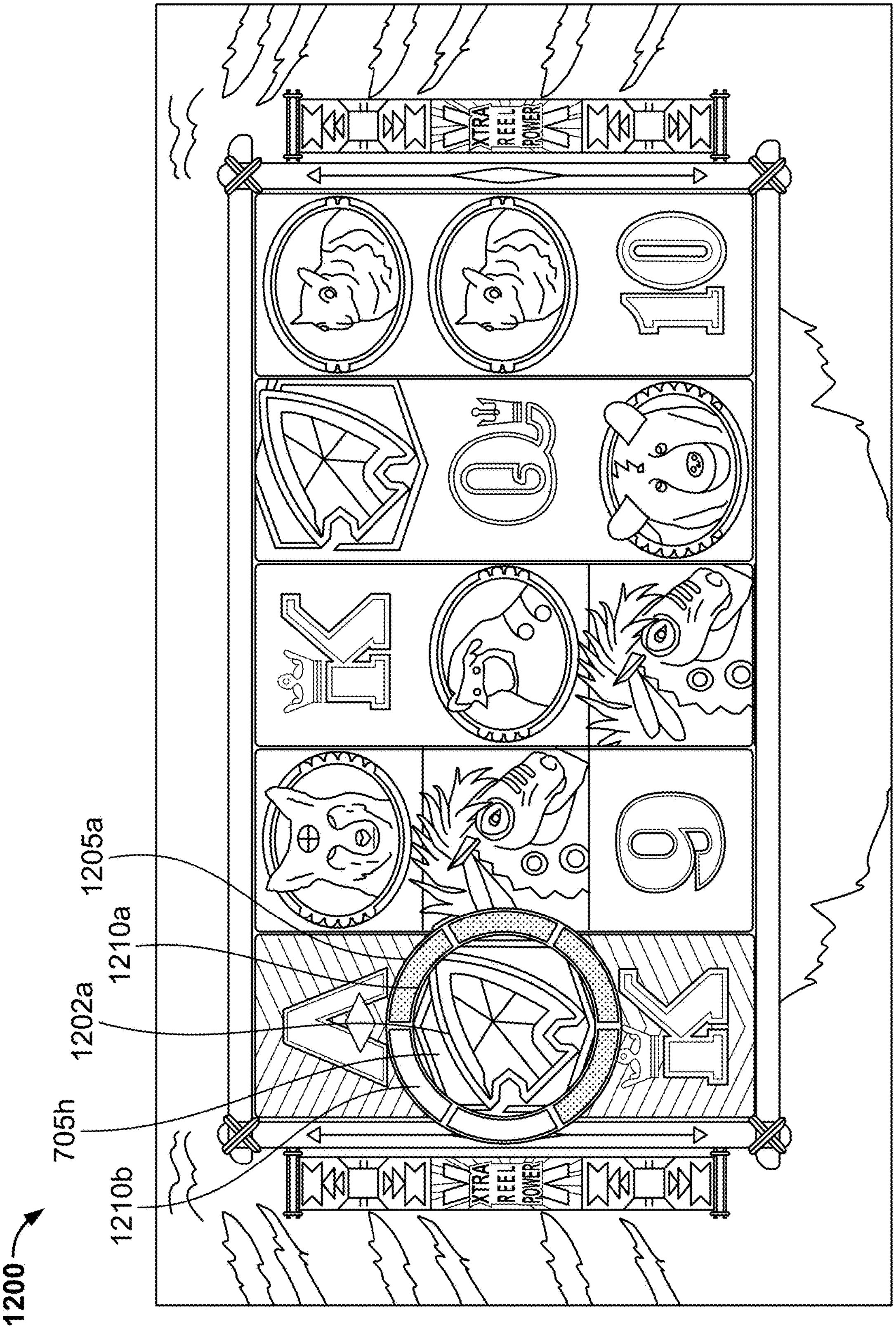
FIG. 12 shows an example of a game outcome that is displayed at a time after the game outcome of FIG. 11 is displayed.

FIG. 12 shows an example of a game outcome that is displayed at a time after the game outcome of FIG. 11 is displayed. At the time depicted in FIG. 12, metamorphic display symbol 705*h* is being displayed in the game outcome 1200. In this example, the metamorphic display symbol 705*h* includes corresponding metamorphic images: metamorphic display symbol 705*h* includes an arrowhead symbol 1202*a* inside a ring 1205*a* having six ring segments. Other implementations may provide more or fewer ring segments, e.g., 3, 4, 5, 7, 8, 9, etc.

According to this example, the state of a metamorphic display symbol is indicated, in part, by the number of filled ring segments 1210*a*, as compared to the number of empty ring segments 1210*b*. In some implementations, the number of filled ring segments 1210*a* will increment when one or more special symbols are displayed in a game outcome. In this example, the number of filled ring segments 1210*a* will increment each time a metamorphic display symbol "lands" and is displayed in a game outcome. In some implementations, the metamorphic display symbol 705*h* may or may not land in any particular game instance. In some such implementations, whether or not the metamorphic display symbol 705*h* lands in any particular game instance may be randomly determined, e.g., according to an RNG call.

Because the metamorphic display symbol 705*h* includes 4 filled ring segments 1210*a*, in this example the game outcome 1200 corresponds with the fourth time that a metamorphic display symbol has landed and has been displayed in a game outcome. Accordingly, the ring 1205*a* is a type of progress indicator.

In this example, the state of a metamorphic display symbol is also indicated, in part, by the number of arrowheads that the metamorphic display symbol includes. According to this implementation, an additional arrowhead will be added to the metamorphic display symbol after all of the ring segments of the ring 1205*a* are filled.

Figure 13:
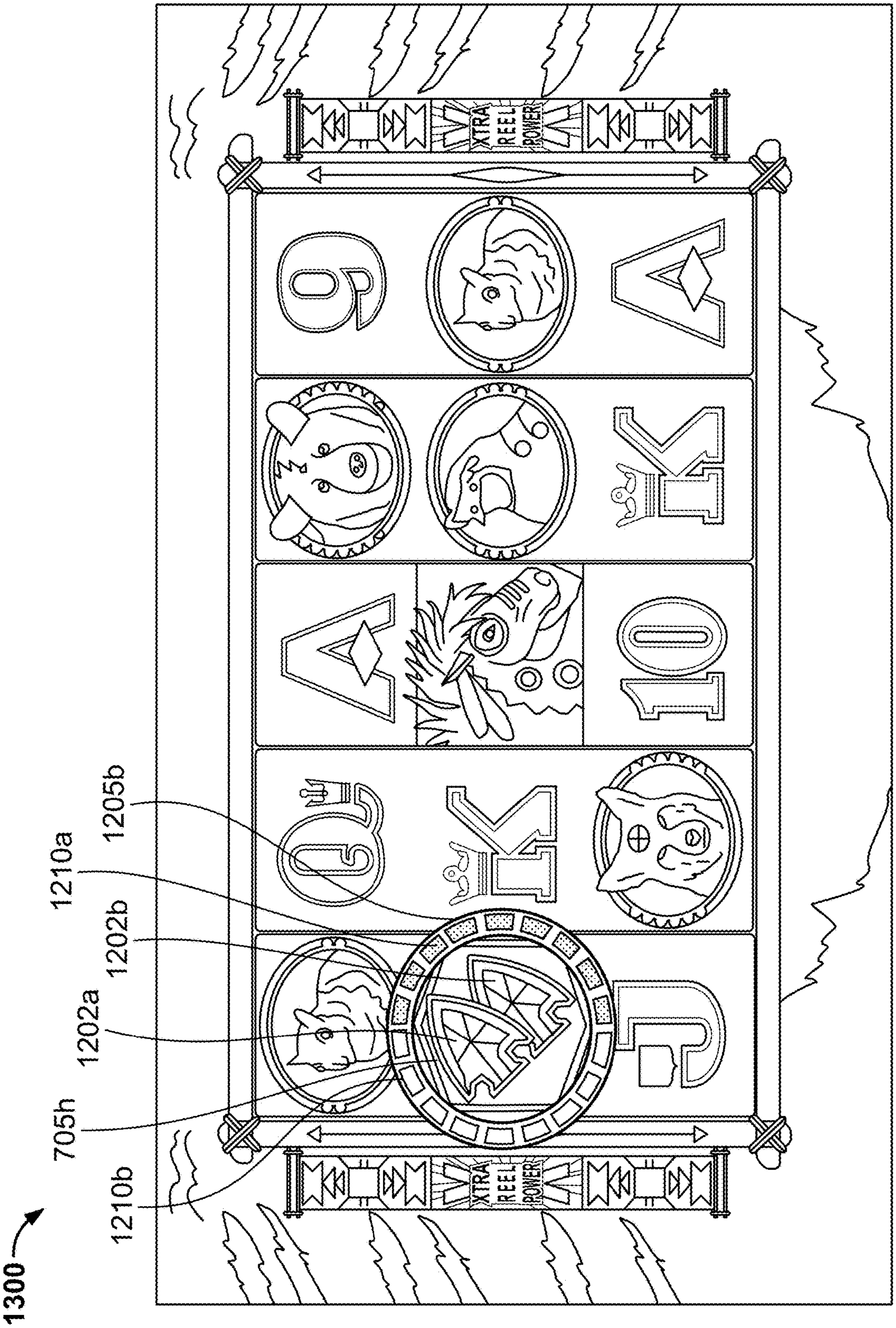
FIG. 13 shows an example of a game outcome that is displayed at a time after the game outcome of FIG. 12 is displayed.

FIG. 13 shows an example of a game outcome that is displayed at a time after the game outcome of FIG. 12 is displayed. At the time depicted in FIG. 13, the metamorphic display symbol 705*h* of the game outcome 1300 includes arrowhead symbols 1202*a* and 1202*b* inside a ring 1205*b* having 18 ring segments. Other implementations may provide more or fewer ring segments, e.g., 10, 11, 12, 13, 14, 15, 16, 17, 19, 20, 21, 22, 23, 24, 25, etc. In this example, the ring 1205*b* includes 9 filled ring segments 1210*a*. According to this example, the game outcome 1300 corresponds with the ninth time that a metamorphic display symbol has landed in a game outcome subsequent to a game outcome in which all of the ring segments of the ring 1205*a* were filled. Accordingly, the ring 1205*b* is one type of progress indicator in this example. Moreover, the arrowhead symbols in the metamorphic display symbol 705*h* are progress indicator symbols in this example. In some examples, if the metamorphic display symbol 705*h* lands, it always lands in the same display symbol row and/or the same display symbol column. However, in other examples if the metamorphic display symbol 705*h* lands, the metamorphic display symbol 705*h* may not always land in the same display symbol row and/or the same display symbol column.

In some implementations, a state of a metamorphic display symbol can correspond with a value of the metamorphic display symbol. According to this example, one or more bonus games will be triggered if at least three arrowhead symbols are presented during a game outcome for one instance of a game. In other implementations, the threshold number of arrowhead symbols required to trigger one or more bonus games may be more or fewer than three, e.g., 2, 4, 5, 6, etc. Because the metamorphic display symbol 705*h* includes two arrowhead symbols, only one additional display symbol that includes an arrowhead needs to land in order to trigger the bonus game. The additional display symbol that includes an arrowhead may or may not be a metamorphic display symbol, depending on the particular implementation. Other implementations may include symbols of another type, along with arrowhead symbols, in the threshold number required to trigger one or more bonus games. For example, one such implementation may require 4 total symbols including 2 different symbol types, 5 total symbols including 3 different symbol types, etc.

After one or more bonus games are triggered, in some implementations a progress indicator will reset. For example, in some instances one or more bonus games may be triggered if at least three arrowhead symbols are presented during a game outcome for one instance of a game. Because the metamorphic display symbol 705*h* includes two arrowhead symbols, if an additional display symbol that includes an arrowhead lands, one or more bonus games will be triggered. In some implementations, after triggering the one or more bonus game the next time that the metamorphic display symbol 705*h* lands, the metamorphic display symbol 705*h* will include a single arrowhead and only a single segment of the ring 1205*a* will be filled.

However, in other implementations a progress indicator may not be immediately reset. For example, for one or more additional base game instances, the next time that the metamorphic display symbol 705*h* lands, the metamorphic display symbol 705*h* will include arrowhead symbols 1202*a* and 1202*b*. During these one or more additional base game instances, only one additional display symbol that includes an arrowhead needs to land in order to trigger one or more bonus games. The number of the one or more additional base game instances may, for example, be based on a wager level.

In some implementations there may be only one metamorphic display symbol that includes a segmented ring and one or more arrowheads. In some such implementations, there may be other arrowhead symbols that include one or more arrowheads, but which are not metamorphic symbols. In some such implementations, the other arrowhead symbols only include one arrowhead. According to some such implementations, the arrowheads of the metamorphic symbol(s) and the arrowheads of the non-metamorphic symbols may count towards achieving a winning combination of arrowhead symbols during a game instance. For example, if four arrowheads are required for a winning combination of arrowhead symbols during a game instance, the arrowhead symbols 1202*a* and 1202*b* may count as two of the four required arrowheads. More generally, in some implementations each of the symbol images that are shown in a metamorphic symbol may count towards achieving a winning combination of symbols (e.g., symbols of the same type) during a game instance. In this example, the number of filled ring segments 1210*a* will increment only if the metamorphic display symbol "lands" and is displayed in a game outcome. In alternative implementations, the number of filled ring segments 1210*a* will also increment if another type of symbol lands, such as an arrowhead symbol, a buffalo head symbol, etc.

In some implementations, the state of a metamorphic display symbol can affect other aspects of a game, such as the number of display symbol rows or display symbol columns in which display symbols are presented during a game instances. For example, after the metamorphic display symbol 705*h* starts to include two arrowhead symbols, one or more additional display symbol rows and/or display symbol columns may be presented. This "reel expansion" may or may not persist for multiple game instances, depending on the particular implementations.

Some implementations may provide alternative or additional ways in which the state of a metamorphic display symbol can correspond with a value of the metamorphic display symbol. According to some such examples, the metamorphic display symbol may be a wild symbol. In some such examples, a higher state of the metamorphic display symbol may correspond with a multiplier for the wild symbol, or with a higher-level multiplier for the wild symbol.

For example, if the metamorphic display symbol includes one arrowhead the metamorphic display symbol may be a wild symbol with no multiplier, but if the metamorphic display symbol includes two arrowheads the metamorphic display symbol may be a wild symbol with a 2× multiplier. In another example, if the metamorphic display symbol includes one arrowhead the metamorphic display symbol is a wild symbol with a 5× multiplier, but if the metamorphic display symbol includes two arrowheads the metamorphic display symbol is a wild symbol with a 10× multiplier. Such implementations may or may not involve triggering one or more bonus games if at least a threshold (e.g., three) number of arrowhead symbols are presented during a game outcome.

In some implementations, the multiplier may increment each time that the number of filled ring segments 1210*a* increments. For example, if the number of filled ring segments 1210*a* of a one-arrowhead metamorphic symbol is 2, the multiplier may be 2×. If the number of filled ring segments 1210*a* of a one-arrowhead metamorphic symbol is 3, the multiplier may be 3×. Alternative, the multiplier may increment each time that an additional number of ring segments 1210*a* are filled (e.g., each time two more ring segments 1210*a* are filled, each time three more ring segments 1210*a* are filled, etc.).

Such implementations may or may not involve triggering one or more bonus games if at least a threshold (e.g., three) number of arrowhead symbols are presented during a game outcome. Because the metamorphic display symbol 705*h* includes two arrowhead symbols, only one additional display symbol that includes an arrowhead needs to land in order to trigger the bonus game. The additional display symbol that includes an arrowhead may or may not be a metamorphic display symbol, depending on the particular implementation.

Figure 14:
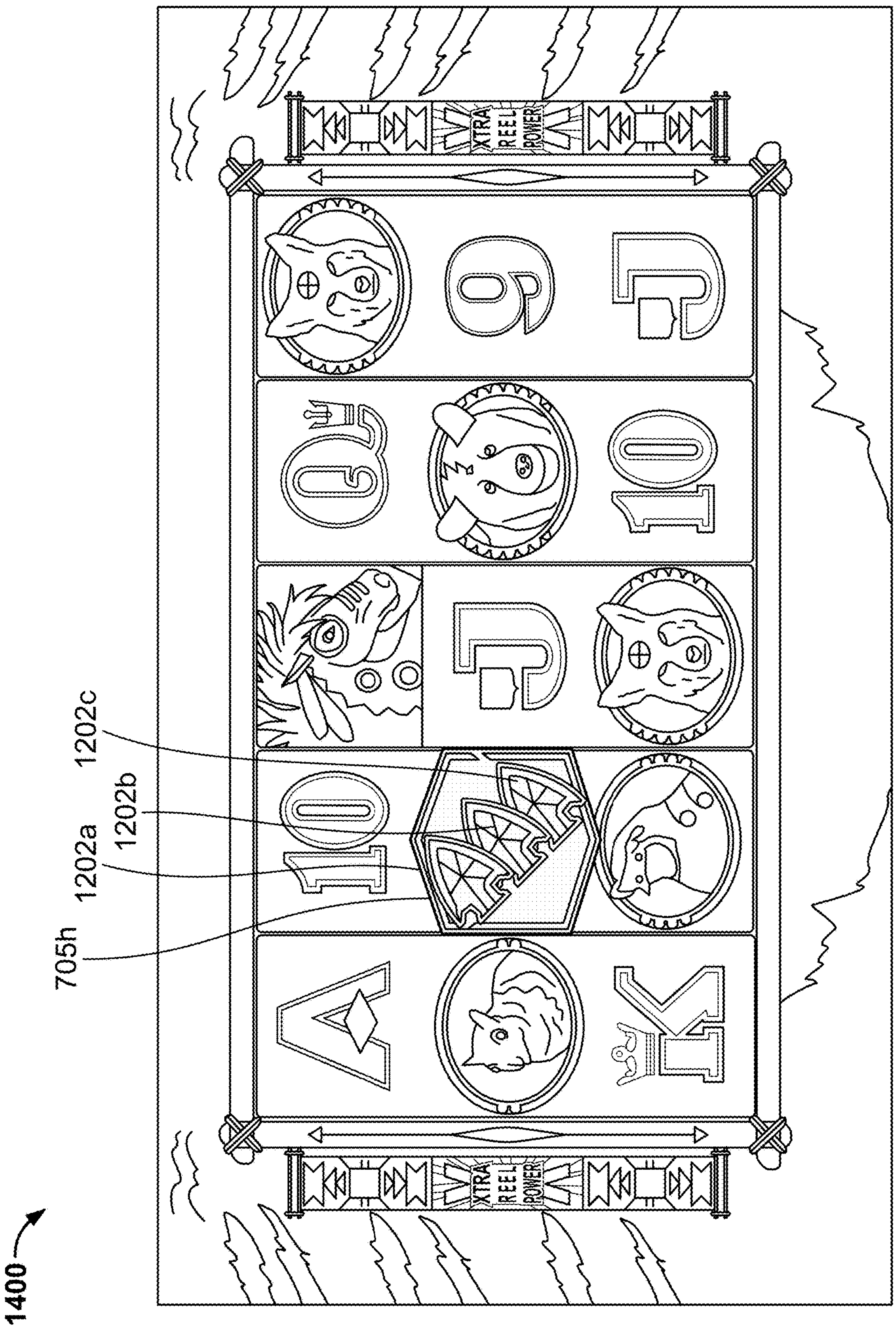
FIG. 14 shows an example of a game outcome that is displayed at a time after the game outcome of FIG. 13 is displayed.

FIG. 14 shows an example of a game outcome that is displayed at a time after the game outcome of FIG. 13 is displayed. At the time depicted in FIG. 14, the metamorphic display symbol 705*h* of the game outcome 1400 includes arrowhead symbols 1202*a*, 1202*b* and 1202*c*. At this stage, the metamorphic display symbol 705*h* does not include a ring around the arrowhead symbols. According to this example, the game outcome 1400 corresponds with a game outcome in which all of the ring segments of the ring 1205*b* (see FIG. 13) were filled. In this implementation, a three-arrowhead state of the metamorphic display symbol 705*h* triggers one or more bonus games. As noted above, in some implementations the arrowheads of the metamorphic symbol (s) and the arrowheads of the non-metamorphic symbols may count towards achieving a winning combination of arrowhead symbols during a game instance. (Corresponding symbols of non-metamorphic symbols, such as the arrowheads of the non-metamorphic symbols in this example, may be referred to herein as "matching" symbols even if the symbols in the metamorphic symbols and the symbols in the non-metamorphic symbols are not identical.) For example, if four arrowheads are required for a winning combination of arrowhead symbols during a game instance, the arrowhead symbols 1202*a*, 1202*b* and 1202*c* may count as three of the four required arrowheads. If only three arrowheads are required for a winning combination of arrowhead symbols during a game instance, the arrowhead symbols 1202*a*, 1202*b* and 1202*c* may count as all three of the required arrowheads.

After one or more bonus games are triggered, in some implementations a progress indicator will reset. For example, in some instances one or more bonus games may be triggered if at least four arrowhead symbols are presented during a game outcome for one instance of a game. Because the metamorphic display symbol 705*h* includes three arrowhead symbols, if an additional display symbol that includes an arrowhead lands, one or more bonus games will be triggered. In some implementations, after triggering the one or more bonus game the next time that the metamorphic display symbol 705*h* lands, the metamorphic display symbol 705*h* will include a single arrowhead and only a single segment of the ring 1205*a* will be filled.

However, in other implementations a progress indicator may not be immediately reset. For example, for one or more additional base game instances, the next time that the metamorphic display symbol 705*h* lands, the metamorphic display symbol 705*h* will include arrowhead symbols 1202*a*, 1202*b* and 1202*c*. During these one or more additional base game instances, only one additional display symbol that includes an arrowhead needs to land in order to trigger one or more bonus games. The number of the one or more additional base game instances may, for example, be based on a wager level.

Figure 15:
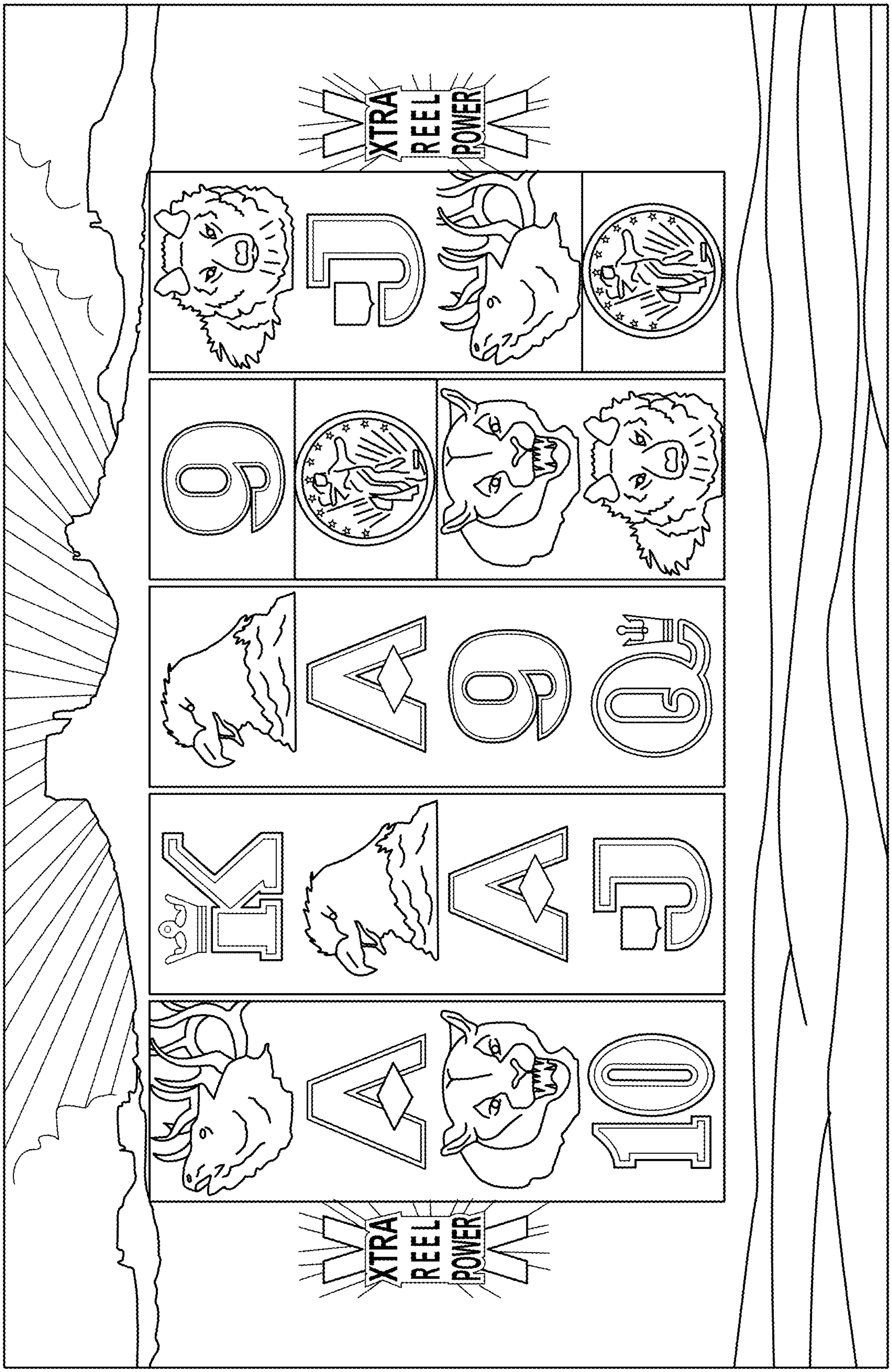
FIG. 15 shows an example of a display of display symbols corresponding with a game outcome for another type of slot game.

FIG. 15 shows an example of a display of display symbols corresponding with a game outcome for another type of slot game. In this example, the slot game also has a Western theme, which is a "Buffalo Gold" theme in this instance. According to this example, the display symbols of the game outcome shown in FIG. 15 do not include any metamorphic display symbols.

Figure 16:
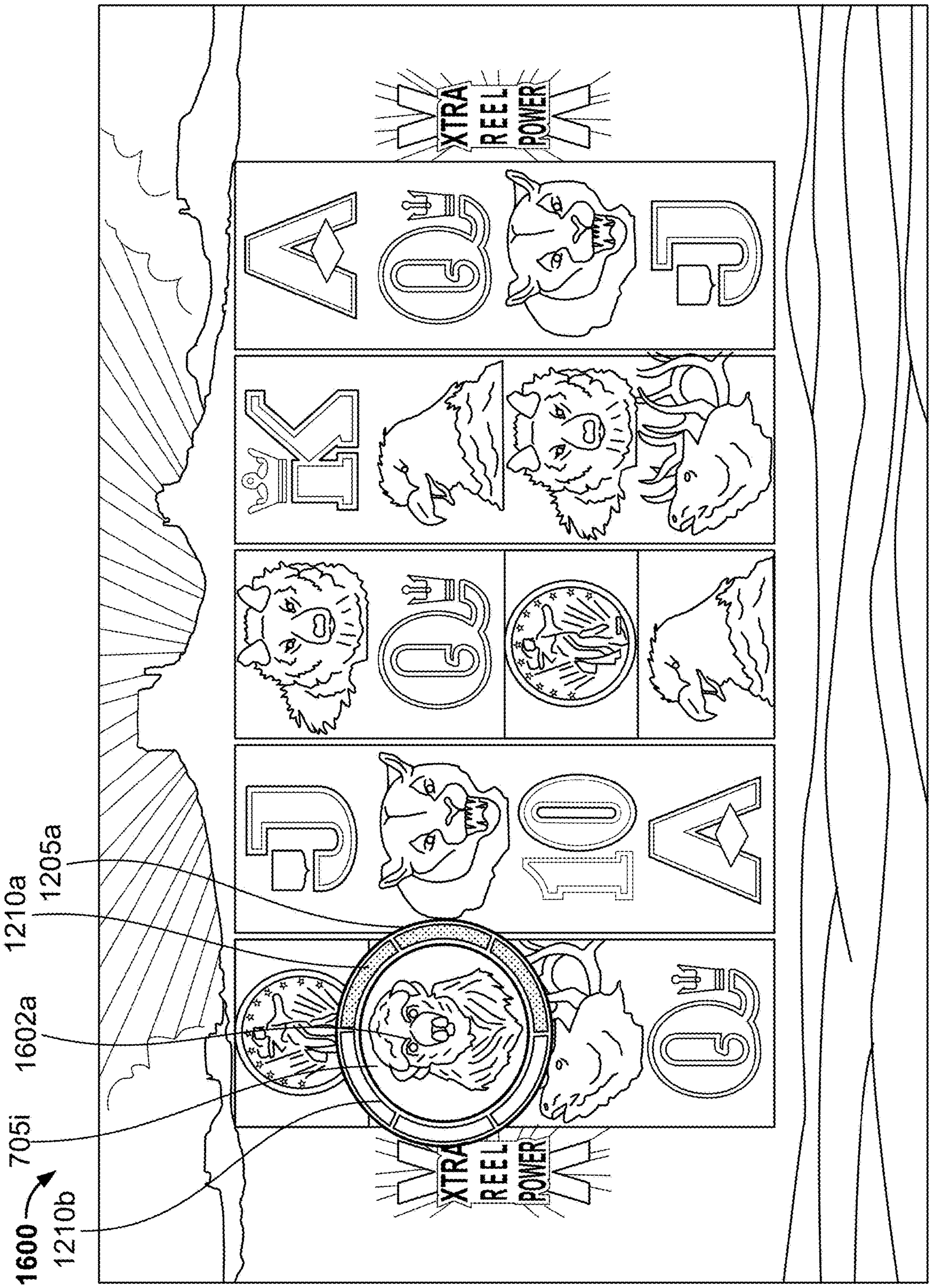
FIG. 16 shows an example of a game outcome that is displayed at a time after the game outcome of FIG. 15 is displayed.

FIG. 16 shows an example of a game outcome that is displayed at a time after the game outcome of FIG. 15 is displayed. At the time depicted in FIG. 16, metamorphic display symbol 705*i* is being displayed in the game outcome 1600. In this example, the metamorphic display symbol 705*i* includes corresponding metamorphic images: metamorphic display symbol 705*i* includes a buffalo head symbol 1602*a* inside a ring 1205*a* having six ring segments. Other implementations may provide more or fewer ring segments.

According to this example, the state of a metamorphic display symbol is indicated, in part, by the number of filled ring segments 1210*a*, as compared to the number of empty ring segments 1210*b*. In some implementations, the number of filled ring segments 1210*a* will increment when one or more special symbols are displayed in a game outcome. In this example, the number of filled ring segments 1210*a* will increment each time a metamorphic display symbol lands and is displayed in a game outcome. Accordingly, because the metamorphic display symbol 705*i* includes 3 filled ring segments 1210*a,* in this example the game outcome 1600 corresponds with the third time that a metamorphic display symbol has landed and has been displayed in a game outcome. In some implementations, the metamorphic display symbol 705*i* may or may not land in any particular game instance.

In this example, the state of a metamorphic display symbol is also indicated, in part, by the number of buffalo heads that the metamorphic display symbol includes. According to this implementation, an additional buffalo head will be added to the metamorphic display symbol after all of the ring segments of the ring 1205*a* are filled.

Figure 17:
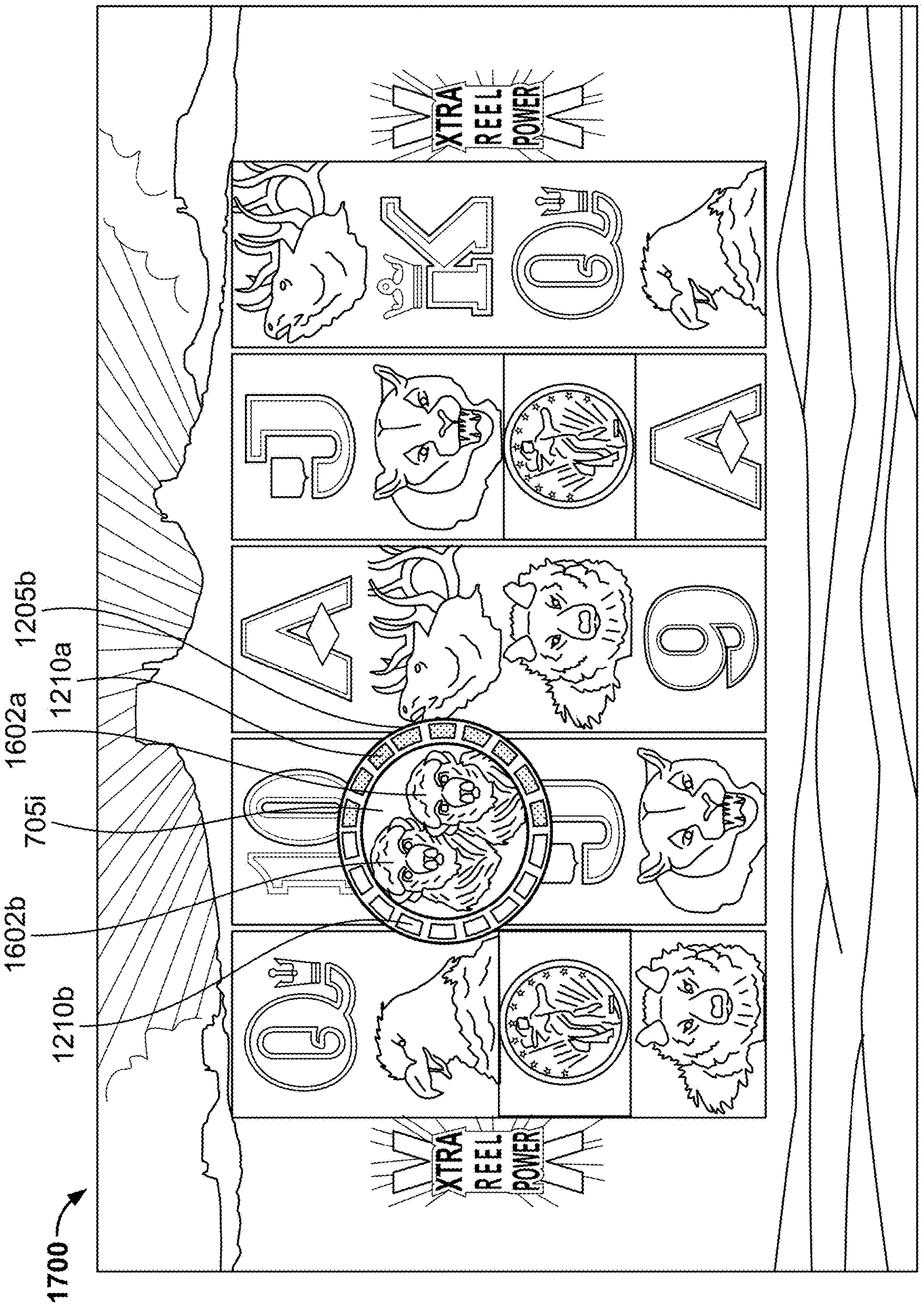
FIG. 17 shows an example of a game outcome that is displayed at a time after the game outcome of FIG. 16 is displayed.

FIG. 17 shows an example of a game outcome that is displayed at a time after the game outcome of FIG. 16 is displayed. At the time depicted in FIG. 17, the metamorphic display symbol 705*i* of the game outcome 1700 includes buffalo head symbols 1602*a* and 1602*b* inside a ring 1205*b* having 18 ring segments. Other implementations may provide more or fewer ring segments. In this example, the ring 1205*b* includes 9 filled ring segments 1210*a.* According to this example, the game outcome 1300 corresponds with the ninth time that a metamorphic display symbol has landed in a game outcome subsequent to a game outcome in which all of the ring segments of the ring 1205*a* were filled. Accordingly, the ring 1205*b* is one type of progress indicator in this example. Moreover, the buffalo head symbols in the metamorphic display symbol 705*i* are progress indicator symbols in this example. In some examples, if the metamorphic display symbol 705*i* lands, it always lands in the same display symbol row and/or the same display symbol column. However, in other examples if the metamorphic display symbol 705*i* lands, the metamorphic display symbol 705*i* may not always land in the same display symbol row and/or the same display symbol column.

According to this example, one or more bonus games will be triggered if at least three buffalo head symbols are presented during a game outcome for one instance of a game. In other implementations, the threshold number of buffalo head symbols required to trigger one or more bonus games may be more or fewer than three, e.g., 2, 4, 5, 6, etc. Because the metamorphic display symbol 705i includes two buffalo head symbols, only one additional display symbol that includes a buffalo head needs to land in order to trigger the bonus game. The additional display symbol that includes a buffalo head may or may not be a metamorphic display symbol, depending on the particular implementation. Other implementations may include symbols of another type, along with buffalo head symbols, in the threshold number required to trigger one or more bonus games. For example, one such implementation may require 4 total symbols including 2 different symbol types, 5 total symbols including 3 different symbol types, etc.

After one or more bonus games are triggered, in some implementations a progress indicator will reset. For example, in some instances one or more bonus games may be triggered if at least three buffalo head symbols are presented during a game outcome for one instance of a game. Because the metamorphic display symbol 705i includes two buffalo head symbols, if an additional display symbol that includes a buffalo head lands, one or more bonus games will be triggered. In some implementations, after triggering the one or more bonus games, the next time that the metamorphic display symbol 705*i* lands, the metamorphic display symbol 705*i* will include a single buffalo head and only a single segment of the ring 1205*b* will be filled.

However, in other implementations a progress indicator may not be immediately reset. For example, for one or more additional base game instances, the next time that the metamorphic display symbol 705*i* lands, the metamorphic display symbol 705*i* will include buffalo head symbols 1602*a* and 1602*b.* During these one or more additional base game instances, only one additional display symbol that includes a buffalo head needs to land in order to trigger one or more bonus games. The number of the one or more additional base game instances may, for example, be based on a wager level.

In some implementations there may be only one metamorphic display symbol that includes a segmented ring and one or more buffalo heads. In some such implementations, there may be other buffalo head symbols that include one or more buffalo heads, but which are not metamorphic symbols. In some such implementations, the other buffalo head symbols only include one buffalo head. According to some such implementations, the buffalo heads of the metamorphic symbol(s) and the buffalo heads of the non-metamorphic symbols may count towards achieving a winning combination of buffalo head symbols during a game instance. For example, if four buffalo heads are required for a winning combination of buffalo head symbols during a game instance, the buffalo head symbols 1602*a* and 1602*b* may count as two of the four required buffalo heads. More generally, in some implementations each of the symbol images that are shown in a metamorphic symbol may count towards achieving a winning combination of symbols during a game instance. In this example, the number of filled ring segments 1210*a* will increment only if the metamorphic display symbol "lands" and is displayed in a game outcome. In alternative implementations, the number of filled ring segments 1210*a* will also increment if another type of symbol lands, such as a non-metamorphic buffalo head symbol, an arrowhead symbol, etc.

As noted elsewhere herein, in some implementations the state of a metamorphic display symbol can affect other aspects of a game, such as the number of display symbol rows or display symbol columns in which display symbols are presented during a game instance. For example, after the metamorphic display symbol 705*i* starts to include two buffalo head symbols, one or more additional display symbol rows and/or display symbol columns may be presented. This reel expansion may or may not persist for multiple game instances, depending on the particular implementations.

Some implementations may provide alternative or additional ways in which the state of a metamorphic display symbol can correspond with a value of the metamorphic display symbol. According to some such examples, the metamorphic display symbol may be a wild symbol. In some such examples, a higher state of the metamorphic display symbol may correspond with a multiplier for the wild symbol, or with a higher-level multiplier for the wild symbol.

For example, if the metamorphic display symbol includes one buffalo head the metamorphic display symbol is a wild symbol with no multiplier, but if the metamorphic display symbol includes two buffalo heads the metamorphic display symbol is a wild symbol with a 2× multiplier. In another example, if the metamorphic display symbol includes one buffalo head the metamorphic display symbol is a wild symbol with a 5× multiplier, but if the metamorphic display symbol includes two buffalo heads the metamorphic display symbol is a wild symbol with a 10× multiplier. Such implementations may or may not involve triggering one or more bonus games if at least a threshold (e.g., three) number of buffalo head symbols are presented during a game outcome.

In some implementations, the multiplier may increment each time that the number of filled ring segments 1210*a* increments. For example, if the number of filled ring segments 1210*a* of a one-buffalo head metamorphic symbol is 2, the multiplier may be 2×. If the number of filled ring segments 1210*a* of a one-buffalo head metamorphic symbol is 3, the multiplier may be 3×. Alternatively, the multiplier may increment each time that an additional number of ring segments 1210*a* are filled (e.g., each time two more ring segments 1210*a* are filled, each time three more ring segments 1210*a* are filled, etc.).

Such implementations may or may not involve triggering one or more bonus games if at least a threshold (e.g., three) number of buffalo head symbols are presented during a game outcome. Because the metamorphic display symbol 705*i* includes two buffalo head symbols, only one additional display symbol that includes a buffalo head needs to land in order to trigger the bonus game. The additional display symbol that includes a buffalo head may or may not be a metamorphic display symbol, depending on the particular implementation.

Figure 18:
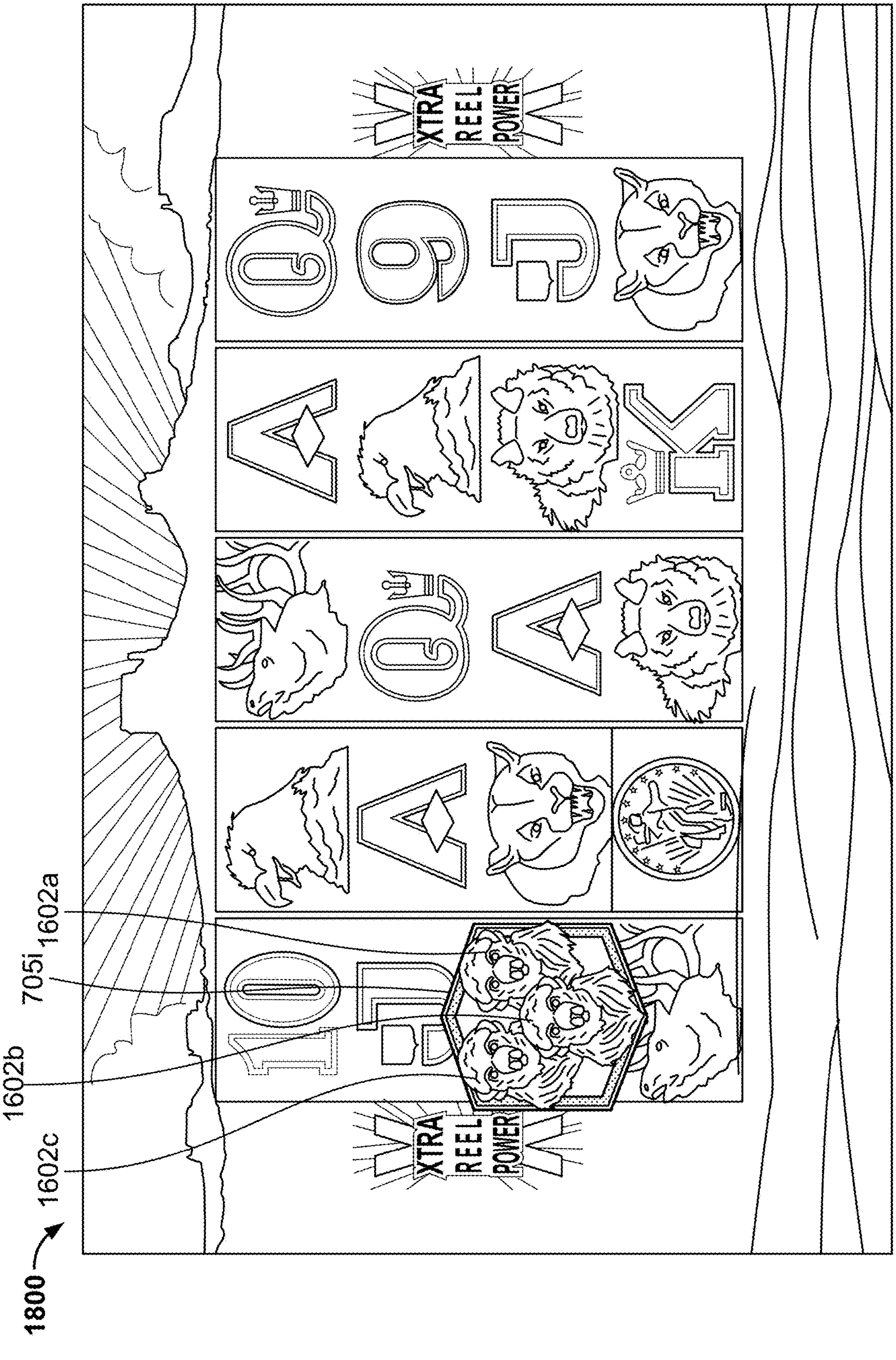
FIG. 18 shows an example of a game outcome that is displayed at a time after the game outcome of FIG. 17 is displayed.

FIG. 18 shows an example of a game outcome that is displayed at a time after the game outcome of FIG. 17 is displayed. At the time depicted in FIG. 18, the metamorphic display symbol 705*i* of the game outcome 1800 includes buffalo head symbols 1602*a,* 1602*b* and 1602*c*. At this stage, the metamorphic display symbol 705*i* does not include a ring around the buffalo head symbols. According to this example, the game outcome 1800 corresponds with a game outcome in which all of the ring segments of the ring 1205*b* (see FIG. 17) were filled. In this implementation, a three-buffalo head state of the metamorphic display symbol 705*i* triggers one or more bonus games. As noted above, in some implementations the buffalo heads of the metamorphic symbol(s) and the buffalo heads of the non-metamorphic symbols count towards achieving a winning combination of buffalo head symbols during a game instance. For example, if four buffalo heads are required for a winning combination of buffalo head symbols during a game instance, the buffalo head symbols 1602*a,* 1602*b* and 1602*c* may count as three of the four required buffalo heads. If only three buffalo heads are required for a winning combination of arrowhead symbols during a game instance, the buffalo head symbols 1602*a,* 1602*b* and 1602*c* may count as all three of the required buffalo heads.

After one or more bonus games are triggered, in some implementations a progress indicator will reset. For example, in some instances one or more bonus games may be triggered if at least four buffalo head symbols are presented during a game outcome for one instance of a game. Because the metamorphic display symbol 705i includes three buffalo head symbols, if an additional display symbol that includes a buffalo head lands, one or more bonus games will be triggered. In some implementations, after triggering the one or more bonus games, the next time that the metamorphic display symbol 705*i* lands, the metamorphic display symbol 705*i* will include a single buffalo head and only a single segment of the ring 1205*b* will be filled.

However, in other implementations a progress indicator may not be immediately reset. For example, for one or more additional base game instances, the next time that the metamorphic display symbol 705*i* lands, the metamorphic display symbol 705*i* will include buffalo head symbols 1602*a,* 1602*b* and 1602*c*. During these one or more additional base game instances, only one additional display symbol that includes a buffalo head needs to land in order to trigger one or more bonus games. The number of the one or more additional base game instances may, for example, be based on a wager level.

Some disclosed implementations provide alternative types of progress indicators. In some such examples, one or more progress indicators may be, or may include, a plurality of images arranged between adjacent display symbol columns or adjacent display symbol rows.

Figure 19:
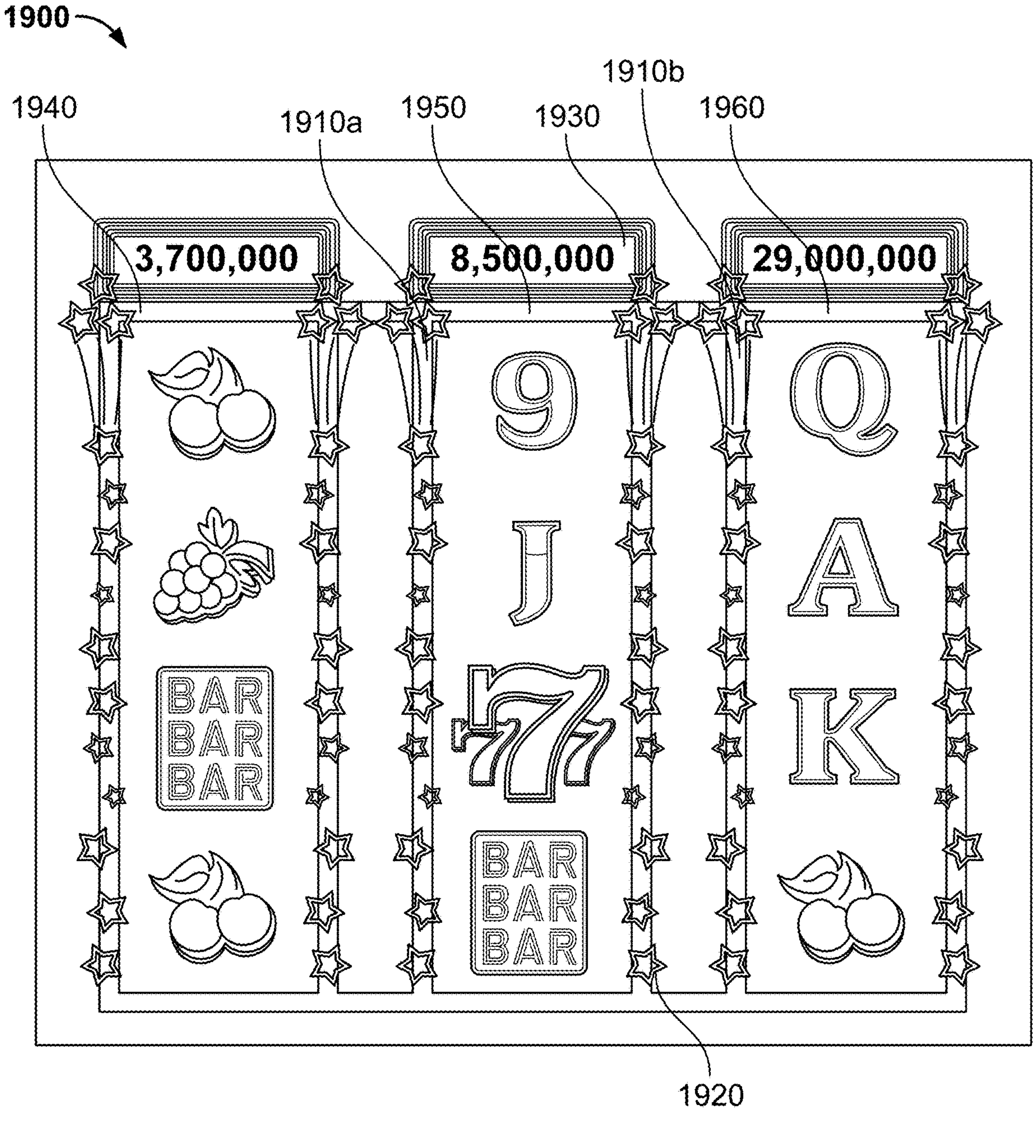
FIG. 19 shows an alternative example of a slot game presentation.

FIG. 19 shows an alternative example of a slot game presentation. In this example, the display 1900 shows a game outcome which includes progress indicators 1910*a* and 1910*b*. In this example, each of the progress indicators 1910*a* and 1910*b* includes a plurality of images 1920, which are images of stars in this instance. Other implementations may include other types of images 1920. In some instances, the images 1920 may correspond with a game theme.

In the example shown in FIG. 19, the images 1920 of the progress indicators are arranged between adjacent display symbol columns: the images 1920 of the progress indicator 1910*a* are arranged between column 1940 and column 1950, whereas the images 1920 of the progress indicator 1910*b* are arranged between column 1950 and column 1960. Accordingly, in this example the images 1920 are arranged on two sides of a display symbol column. In this instance, images 1920 are arranged from a bottom to a top of a display symbol column.

Figure 20:
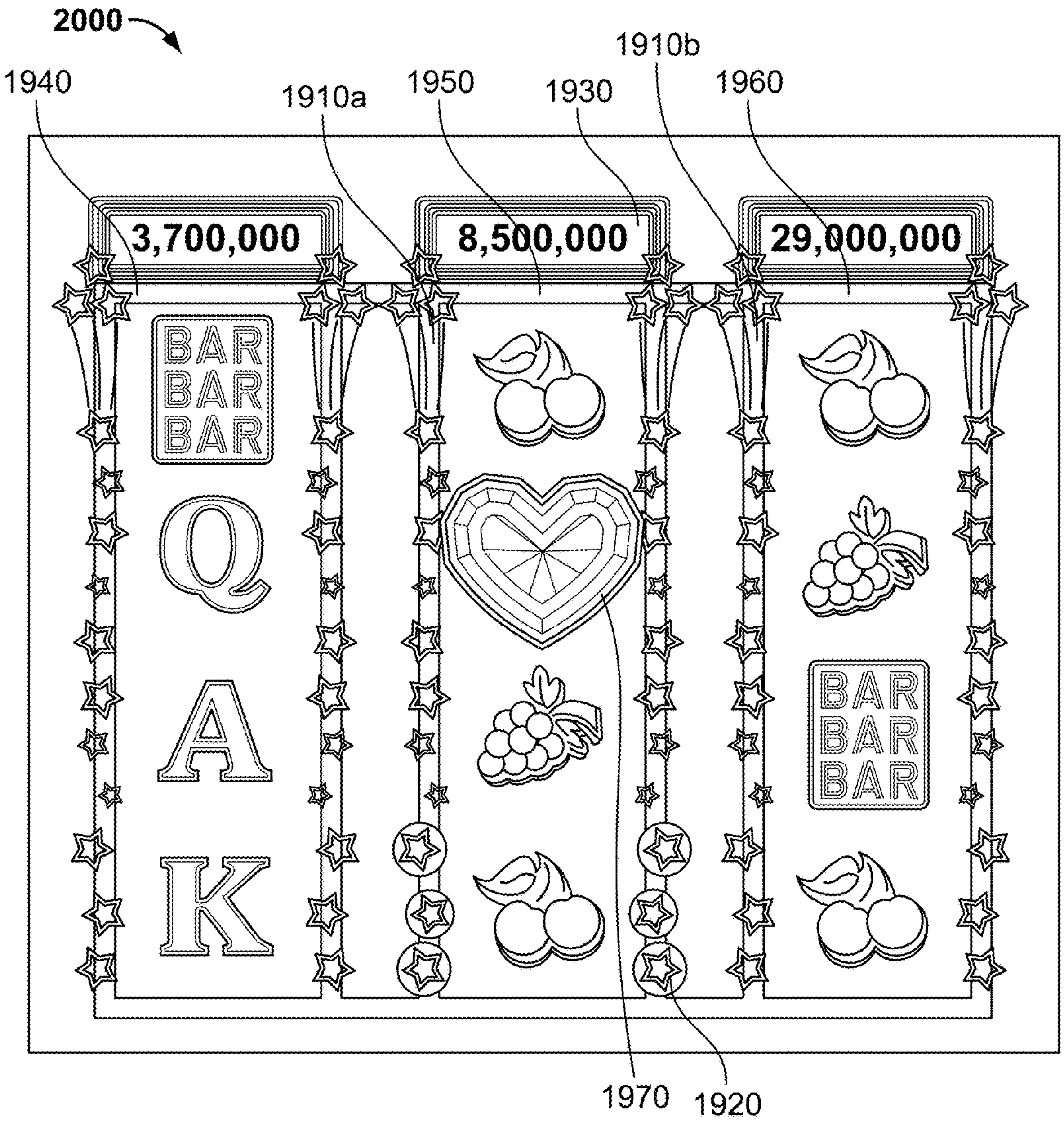
FIG. 20 shows an example of a game outcome that is displayed at a time after the game outcome of FIG. 19 is displayed.

FIG. 20 shows an example of a game outcome that is displayed at a time after the game outcome of FIG. 19 is displayed. At the time depicted in FIG. 20, the game outcome includes an instance of the symbol 1970. Accordingly, six of the images 1920 are now illuminated. In some alternative implementations, more or fewer of the images 1920 (e.g., 2, 4, 8, 10, etc.) may be illuminated each time a special symbol lands. In this example, the number of illuminated instances of the images 1920 corresponds to the level of progress towards attaining a goal, which in this example is the 8,500,000 credit award shown in the credit award window 1930 at the top of the column 1950.

According to this implementation, the symbol 1970 is not a metamorphic symbol. However, in other implementations the symbol 1970 may be a metamorphic symbol. According to some such implementations, the state of the metamorphic symbol also may correspond to the level of progress towards attaining a goal.

Figure 21:
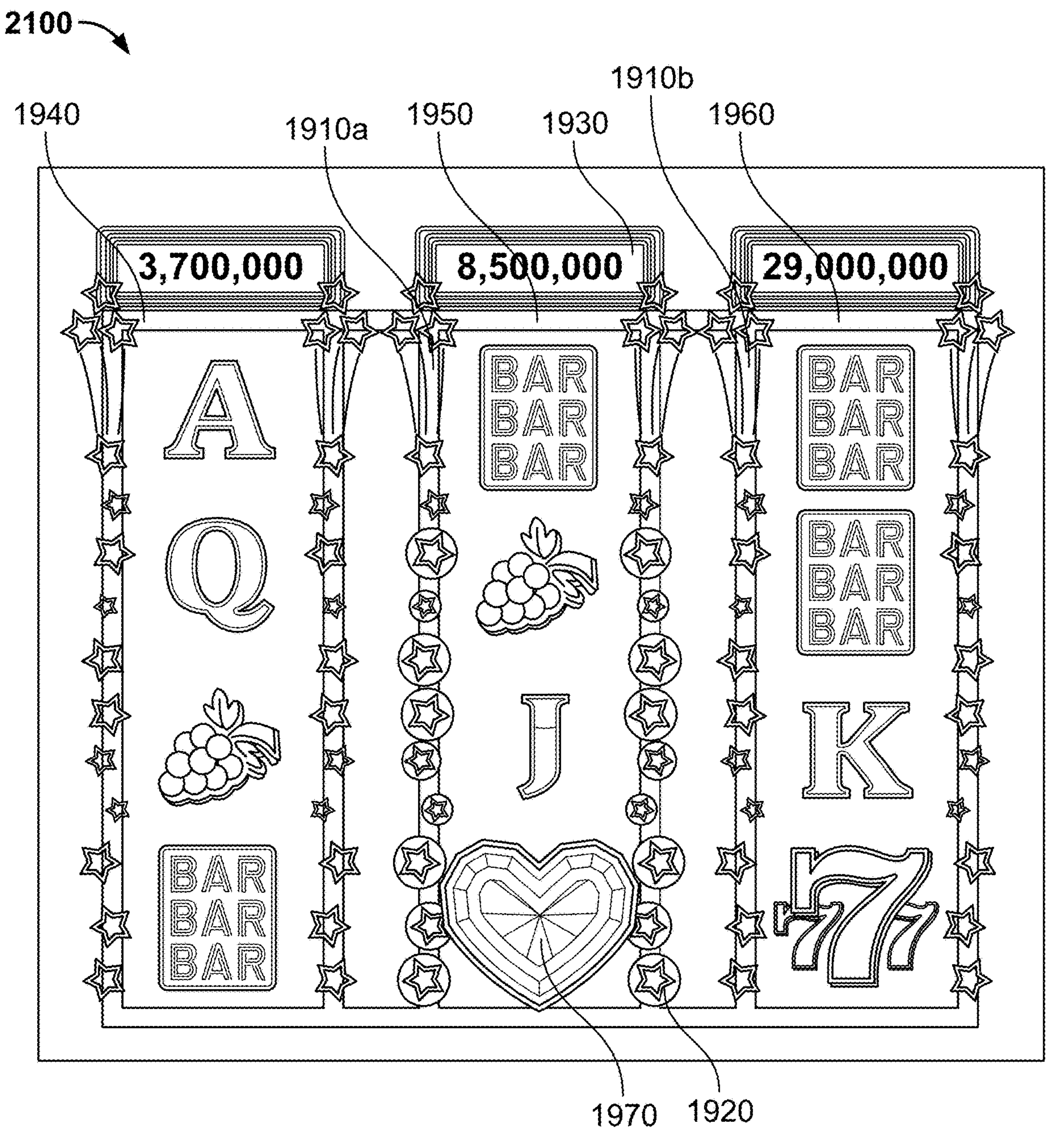
FIG. 21 shows an example of a game outcome that is displayed at a time after the game outcome of FIG. 20 is displayed.

FIG. 21 shows an example of a game outcome that is displayed at a time after the game outcome of FIG. 20 is displayed. In this instance, a previous game outcome, which occurred between the time depicted in FIG. 20 and the time depicted in FIG. 21, included another instance of the symbol 1970. At the time depicted in FIG. 21, the game outcome includes a third instance of the symbol 1970. At this time, eighteen of the images 1920 are now illuminated.

Figure 22:
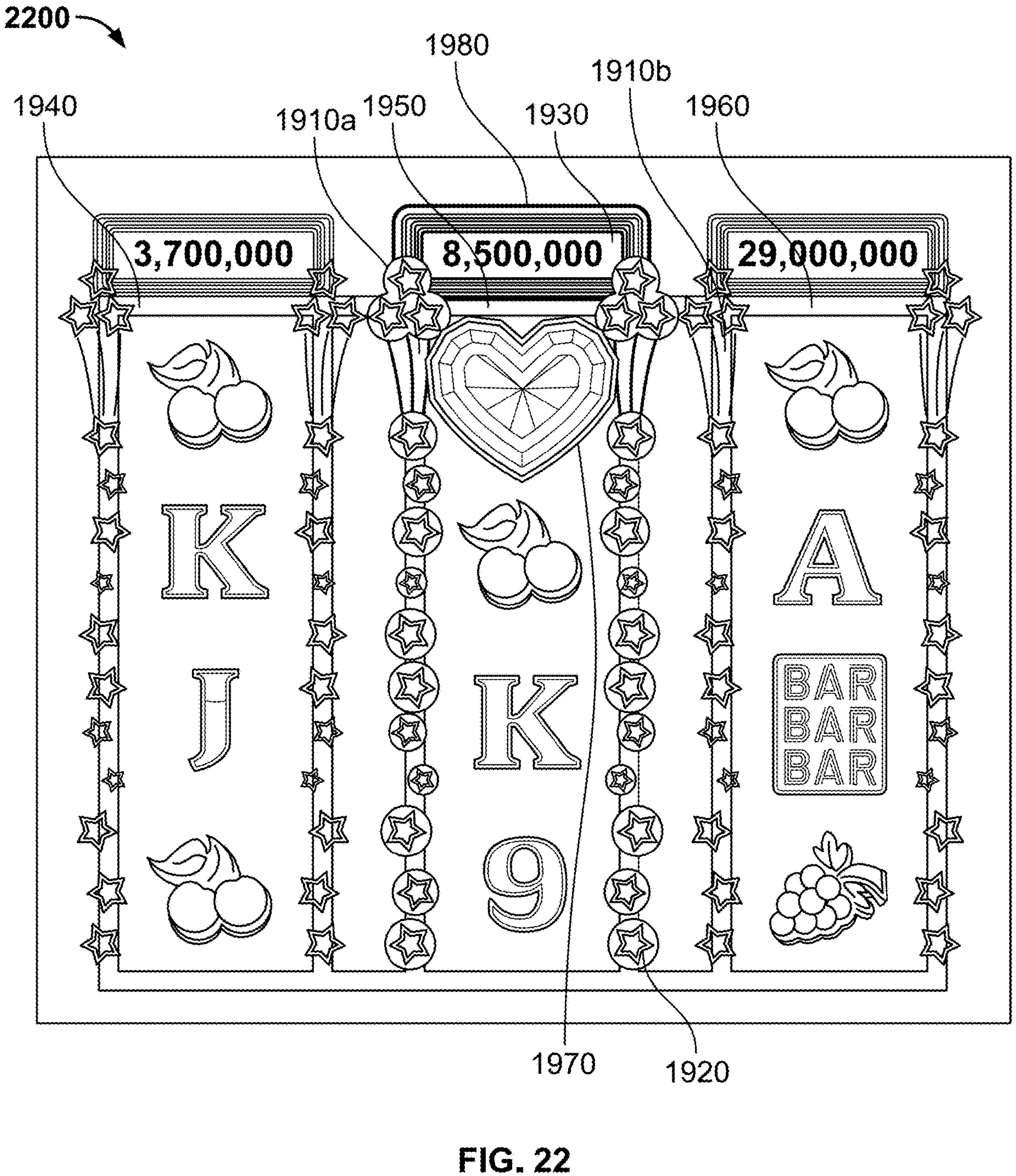
FIG. 22 shows an example of a game outcome that is displayed at a time after the game outcome of FIG. 21 is displayed.

FIG. 22 shows an example of a game outcome that is displayed at a time after the game outcome of FIG. 21 is displayed. At the time depicted in FIG. 22, the game outcome includes another instance of the symbol 1970. At this time, all of the images 1920 are now illuminated. In this example, the goal, which in this example is the 8,500,000 credit award shown in the credit award window 1930 at the top of the column 1950, has been attained. Therefore, the border 1980 around the credit award window 1930 is now illuminated. In some implementations, other celebration sounds and/or images may be provided.

In the foregoing example, a special symbol needed to land in a particular display symbol column in order to make progress towards a goal that would be indicated by progress indicators. In alternative examples, the special symbol could land in more than one display symbol column (e.g., in any display symbol column) and progress would nonetheless be made towards the goal. The progress could be indicated by progress indicators corresponding to the column in which the special symbol lands. In still other implementations, a special symbol needed to land in a particular display symbol row in order to make progress towards a goal that would be indicated by progress indicators corresponding to that row. In alternative examples, the special symbol could land in more than one display symbol row (e.g., in any display symbol row) and progress would nonetheless be made towards the goal.

While various implementations have been described with respect to the figures, it will be appreciated that many modifications and changes may be made by those skilled in the art without departing from the scope of the present disclosure. Any such variation and derivation from the above description and figures are included in the scope of the present disclosure as defined by the claims.

The invention claimed is:

1. A gaming device, comprising:

a display system including one or more displays;

an interface system including at least one network interface and at least one user interface; and a control system including one or more processors, the control system being configured for:

receiving, via the interface system, user input for initiation of an instance of a wagering game, the wagering game comprising a slot game;

determining a game outcome and corresponding display symbols, the game outcome comprising an award determination, wherein at least one of the display symbols available for presentation in a main game area is a first metamorphic display symbol comprising a first progress indicator and a number of second progress indicator symbols, wherein the first progress indicator indicates progress towards attaining a first goal and the second progress indicator indicates progress towards attaining a second goal, wherein the goal is attained by a combination of the number of second progress indicator symbols in the first metamorphic display symbol and one or more matching symbols in one or more non-metamorphic symbols and wherein determining the game outcome involves determining that the first progress indicator and the second progress indicator will be updated;

controlling the display system to display the display symbols at a plurality of display symbol positions of the main game area on a display device of the display system and to display the first metamorphic display symbol with an updated first progress indicator and an updated second progress indicator, wherein the plurality of display symbol positions are arranged in a plurality of display symbol rows and display symbol columns; and controlling the display system to present award effects corresponding to the award determination.

2. The gaming device of claim 1, wherein the control system is further configured for controlling the display system to display a third progress indicator in the main game area corresponding to the level of progress towards attaining a third goal, the third progress indicator being displayed separately from the first metamorphic display symbol.

3. The gaming device of claim 2, wherein the third progress indicator comprises a progress meter.

4. The gaming device of claim 2, wherein the third progress indicator comprises a plurality of images arranged between adjacent display symbol columns or adjacent display symbol rows.

5. The gaming device of claim 4, wherein a number of illuminated instances of the plurality of images corresponds to the level of progress towards attaining the third goal.

6. The gaming device of claim 5, wherein the plurality of images are arranged on two sides of a display symbol column or a display symbol row.

7. The gaming device of claim 6, wherein instances of the plurality of images are arranged from a bottom to a top of the display symbol column.

8. The gaming device of claim 7, wherein the control system is further configured for controlling the display system to display an award corresponding to the third goal at the top of the display symbol column.

9. The gaming device of claim 1, wherein the second goal comprises a feature presentation, the feature presentation comprising one or more bonus games.

10. The gaming device of claim 1, wherein the first goal involves incrementing the second progress indicator.

11. A gaming device, comprising:

a display system including one or more displays;

an interface system including at least one network interface and at least one user interface; and a control system including one or more processors, the control system being configured for:

receiving, via the interface system, user input for initiation of an instance of a wagering game, the wagering game comprising a slot game;

determining a game outcome and corresponding display symbols, the game outcome comprising an award determination, wherein at least one of the display symbols available for presentation in a main game area is a first metamorphic display symbol comprising a first progress indicator and a second progress indicator, wherein the first progress indicator is displayed in a ring surrounding the second progress indicator, wherein the first progress indicator indicates progress towards attaining a first goal and the second progress indicator indicates progress towards attaining a second goal and wherein determining the game outcome involves determining that the first progress indicator and the second progress indicator will be updated;

controlling the display system to display the display symbols at a plurality of display symbol positions of the main game area on a display device of the display system and to display the first metamorphic display symbol with an updated first progress indicator and an updated second progress indicator, wherein the plurality of display symbol positions are arranged in a plurality of display symbol rows and display symbol columns; and controlling the display system to present award effects corresponding to the award determination.

12. The gaming device of claim 11, wherein progress towards attaining the first goal is indicated by filled segments of the ring.

13. The gaming device of claim 11, wherein the second goal comprises a feature presentation, the feature presentation comprising one or more bonus games.

14. The gaming device of claim 11, wherein the first goal involves incrementing the second progress indicator.

15. The gaming device of claim 11, wherein the level of progress towards attaining the first goal corresponds with a number of instances during which the first metamorphic display symbol is presented as part of a game outcome.

16. A gaming device, comprising:

a display system including one or more displays;

an interface system including at least one network interface and at least one user interface; and a control system including one or more processors, the control system being configured for:

receiving, via the interface system, user input for initiation of an instance of a wagering game, the wagering game comprising a slot game;

determining a game outcome and corresponding display symbols, the game outcome comprising an award determination, wherein at least one of the display symbols available for presentation in a main game area is a first metamorphic display symbol comprising a first progress indicator and a second progress indicator, wherein the first progress indicator indicates progress towards attaining a first goal and the second progress indicator indicates progress towards attaining a second goal, wherein a maximum value of the first metamorphic display symbol award corresponds to a state of a first metamorphic image and wherein determining the game outcome involves determining an award amount;

controlling the display system to display the display symbols at a plurality of display symbol positions of the main game area on a display device of the display system, wherein the plurality of display symbol positions are arranged in a plurality of display symbol rows and display symbol columns and wherein the controlling involves controlling the display system to display a sequence of images corresponding to a rotation of the first metamorphic display symbol to show an opposite side of the first metamorphic display symbol on which the award amount is displayed; and controlling the display system to present award effects corresponding to the award determination.

17. The gaming device of claim 16, wherein the first goal involves incrementing the second progress indicator.

18. The gaming device of claim 16, wherein the first progress indicator is displayed in a ring surrounding the second progress indicator.

19. The gaming device of claim 18, wherein progress towards attaining the first goal is indicated by filled segments of the ring.

20. The gaming device of claim 16, wherein the second goal comprises a feature presentation, the feature presentation comprising one or more bonus games.

* * * * *